United States Patent [19]

King et al.

[11] Patent Number: 4,530,052
[45] Date of Patent: Jul. 16, 1985

[54] APPARATUS AND METHOD FOR A DATA PROCESSING UNIT SHARING A PLURALITY OF OPERATING SYSTEMS

[75] Inventors: James L. King; Marion G. Porter, both of Phoenix; Phillip A. Angelle, Glendale; Joseph C. Circello, Phoenix; John E. Wilhite, Glendale; Leonard G. Trubisky, Scottsdale, all of Ariz.

[73] Assignee: Honeywell Information Systems Inc., Phoenix, Ariz.

[21] Appl. No.: 434,383

[22] Filed: Oct. 14, 1982

[51] Int. Cl.³ .............................................. G06F 9/00
[52] U.S. Cl. .................................................. 364/200
[58] Field of Search ................................ 364/200, 900

[56] References Cited

U.S. PATENT DOCUMENTS 4,347,565  8/1983  Kaneda et al. ...................... 364/200
4,400,769  8/1982  Kaneda et al. ...................... 364/200

Primary Examiner—Thomas M. Heckler
Assistant Examiner—Tim A. Wiens
Attorney, Agent, or Firm—A. A. Sapelli; L. J. Marhoefer; J. S. Solakian

[57] ABSTRACT

Apparatus and method for a supervisor for data processing system capable of utilizing a plurality of operating systems. The supervisor includes apparatus for identifying a condition in the data processing system requiring a different operating system. A reserved memory area associated with the currently active operating system is then addressed and register contents of a central processing unit are stored in the reserved memory area. The reserved memory of the operating system being activated is addressed and causes the address of the reserved memory of the operating system being activated, the data related to permitting the physical memory associated with the operating system being activated, contents of registers safestored in the reserve-memory and, data establishing the decor of the operating system being activated are entered in the central processing unit. The operating system to be activated is then enabled, and execution of permitted instructions by the second operating system is begun. The physical memory locations are determined by a real address through use of a paging mechanism permitting storage of portions of the operating systems in non-contiguous groups of locations while isolating the memory available to each operating system.

6 Claims, 21 Drawing Figures

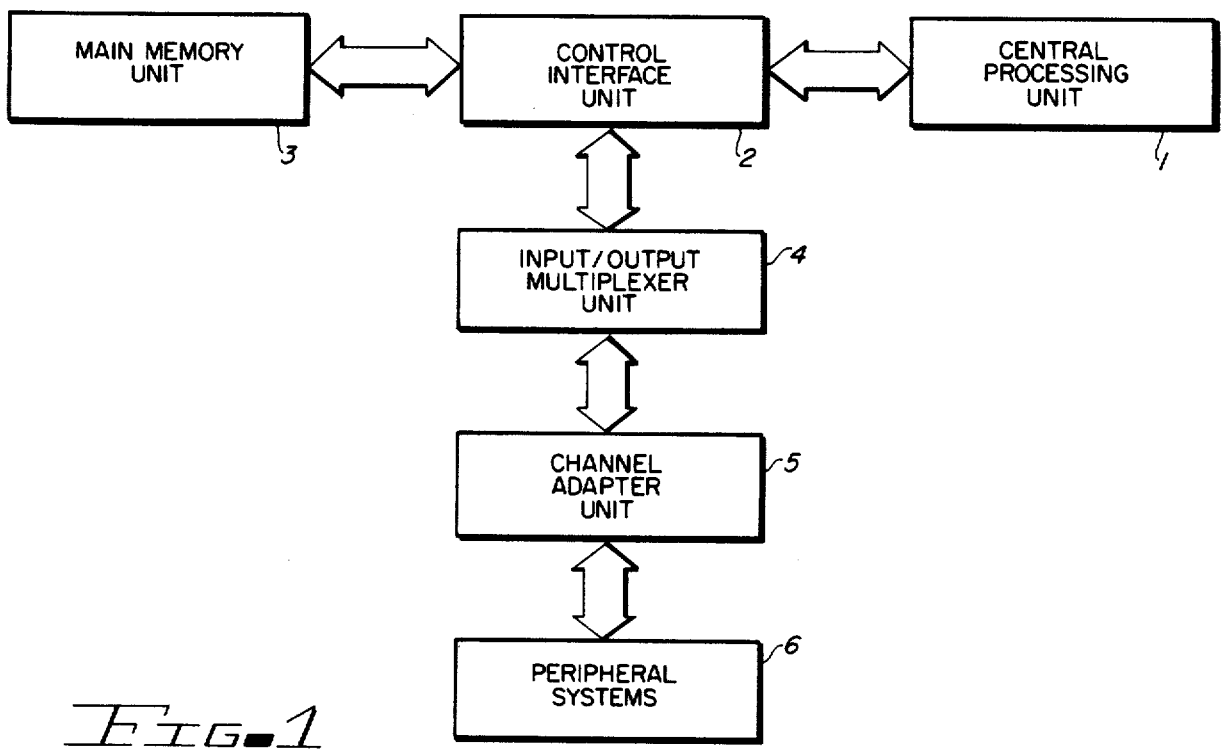
FIG. 1
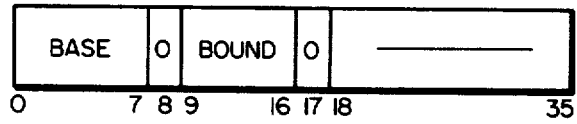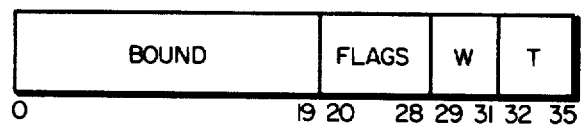
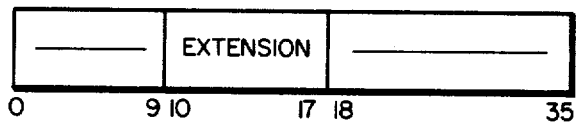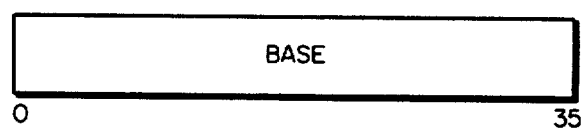
FIG. 4A — BASIC DECOR DESCRIPTOR
FIG. 4B — VIRTUAL DECOR DESCRIPTOR
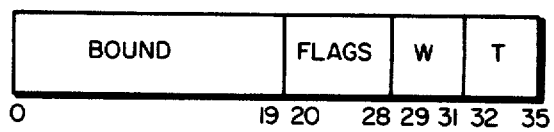
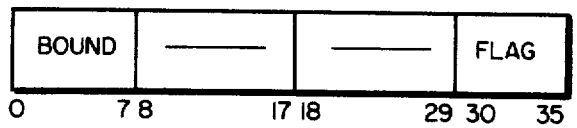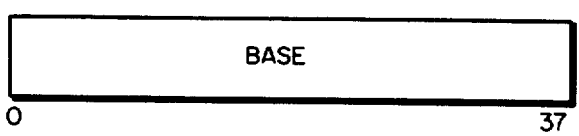
FIG. 4C — MULTICS DECOR DESCRIPTOR
FIG. 4D — COMPOSITE DECOR DESCRIPTOR

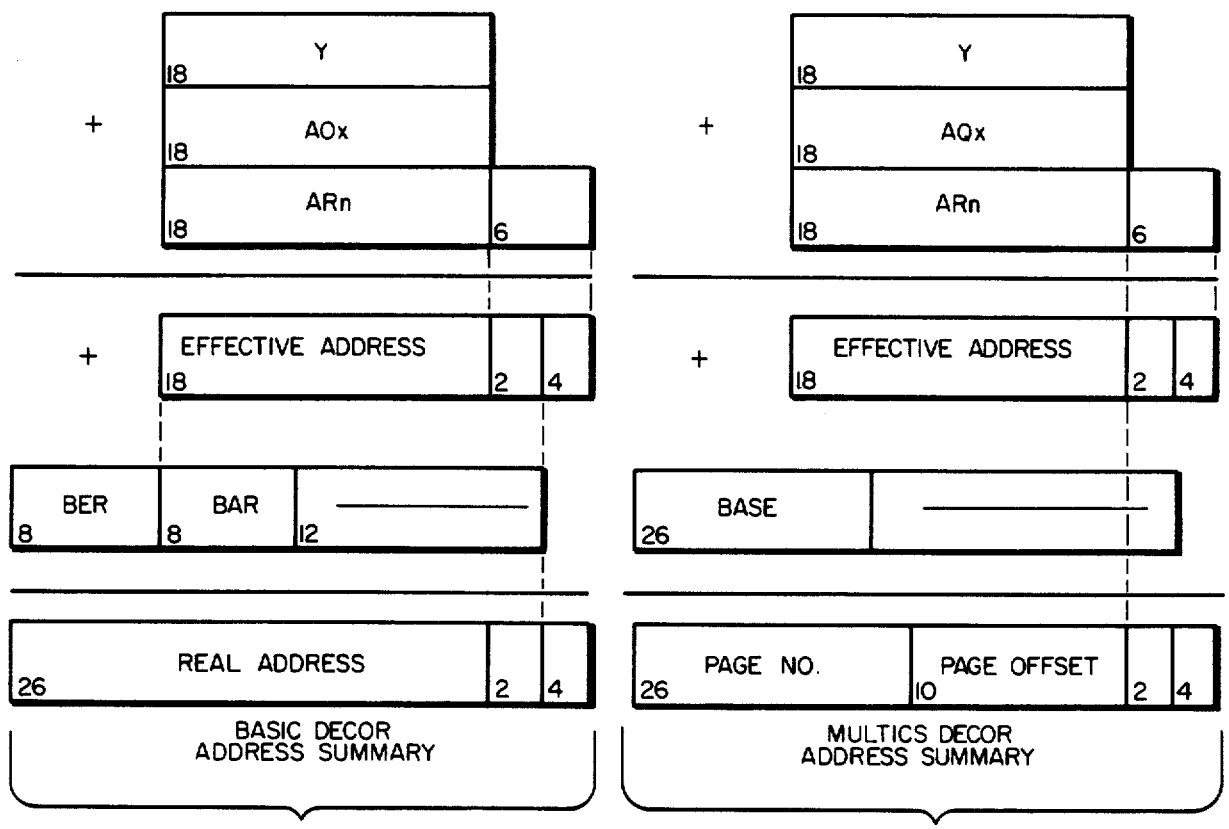
Fig. 6A — Fig. 6B
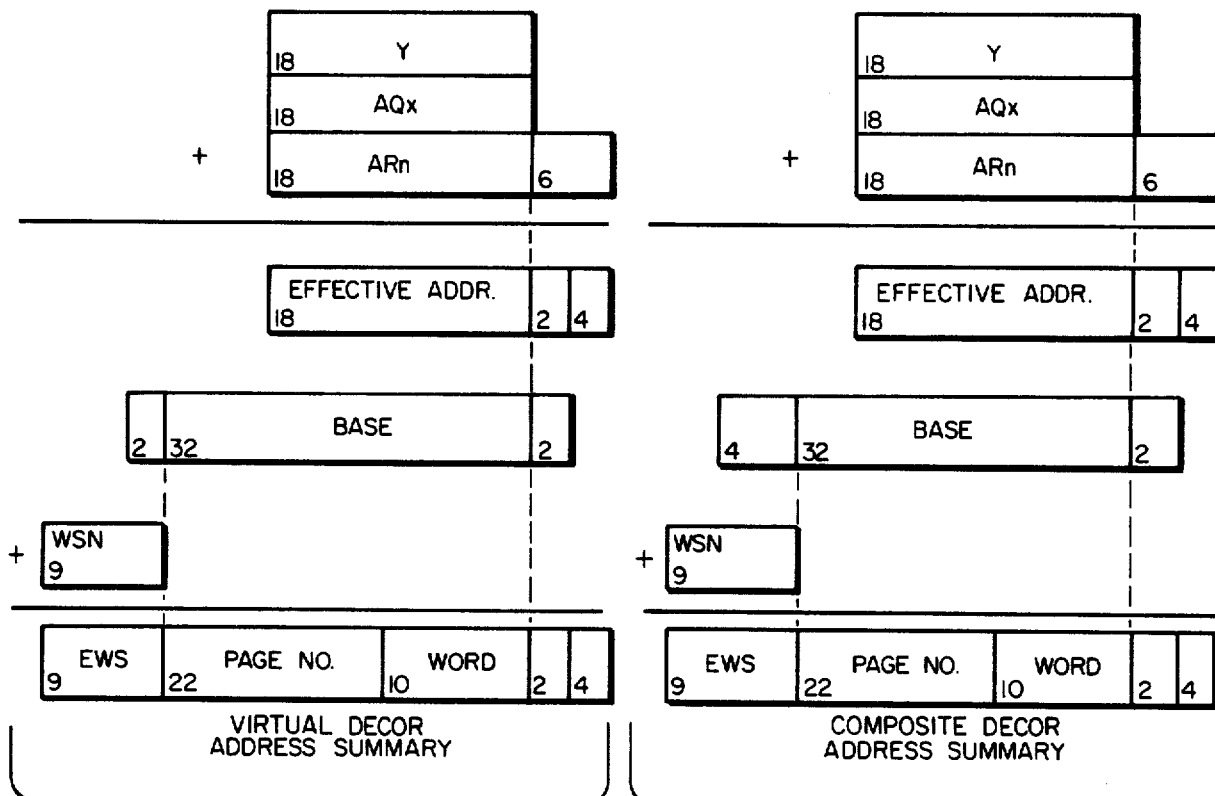
Fig. 6C — Fig. 6D

APPARATUS AND METHOD FOR A DATA PROCESSING UNIT SHARING A PLURALITY OF OPERATING SYSTEMS

BACKGROUND OF THE INVENTION

1. Field of the Invention

This invention relates generally to the control of the execution of instructions by a data processing system and more particularly to a data processing system capable of sharing a plurality of operating systems.

2. Description of the Related Art

It is known in the related art to provide a data processing system capable of execution of an instruction set under control of a single operating system. Each operating system has an interior decor, including a distinctive address formation and instruction processing characteristics, that prohibit easy portability of operating systems. In order to utilize a plurality of operating systems, it has been necessary to alter the operating systems or add additional apparatus to operate additional apparatus. In addition, it is frequently necessary to reinitialize the data processing system each time a different operating system was activated. Frequently, improvements in operating systems require a change in apparatus and can cause problems in data systems. In addition, fault procedures residing in the memory unit have the characteristics of a specialized operating system.

Therefore, the need has existed for a data processing system capable of sharing a plurality of operating systems.

SUMMARY OF THE INVENTION

It is therefore an object of the present invention to provide an improved data processing system.

It is a further object of the present invention to permit a data processing system to operate under control of a plurality of operating systems.

It is a particular object of the present invention to permit the isolation of a plurality of operating systems.

It is another particular object of the present invention to ensure that unpermitted instructions are not executed by a currently active operating system.

It is yet another object of the present invention to provide a procedure for terminating operation of a currently active operating system and initialize operation of a different operating system.

The aforementioned and other objects of the present invention are accomplished by providing apparatus which will support the execution of instructions from a plurality of operating systems. Apparatus is also provided to isolate the operating systems and to ensure that only the instructions of the currently active operating system are executed. A memory space, unavailable to the plurality of operating systems is available for each operating system to permit an orderly exchange of operating systems.

These and other features of the invention will be clear upon reading of the specification along with the figures.

BRIEF DESCRIPTION OF THE DRAWINGS

FIG. 1 is a block diagram of a data processing system.

FIG. 4A is a diagram of a typical basic decor descriptor format.

FIG. 4B is a diagram of a typical virtual decor descriptor format.

FIG. 4C is a diagram of a typical multics decor descriptor format.

FIG. 4D is a diagram of a typical composite decor descriptor format.

FIG. 6A is a symbolic diagram of the addressing mechanism in the basic decor.

FIG. 6B is a symbolic diagram of the addressing mechanism of the multics decor.

FIG. 6C is a symbolic diagram of the addressing mechanism of the virtual decor.

FIG. 6D is a symbolic diagram of the addressing mechanism of the composite decor.

DETAILED DESCRIPTION OF THE PREFERRED EMBODIMENT

Figure 2:
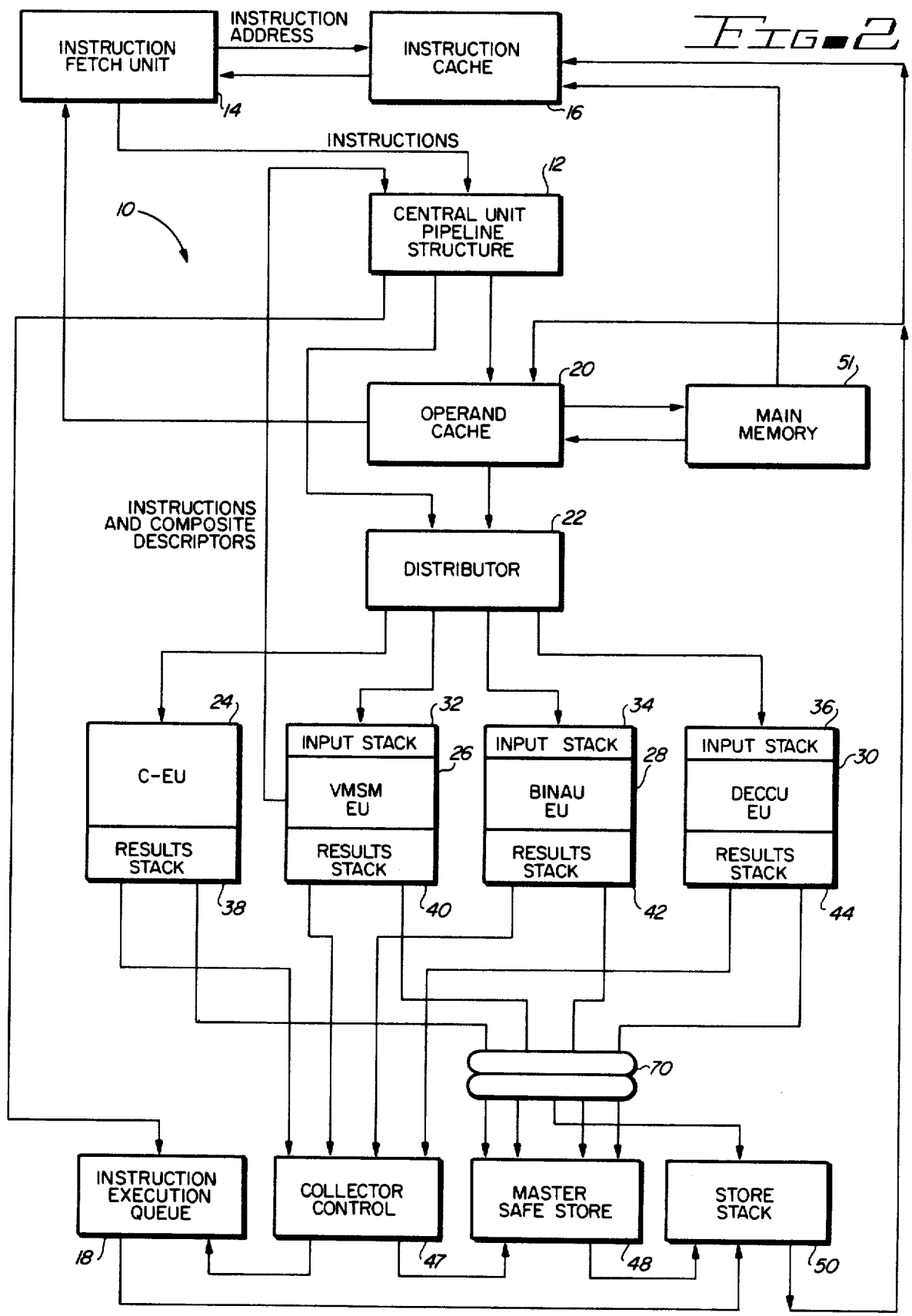
FIG. 2 is a block central processing unit including the VMSM execution unit of the present invention.

Referring to FIG. 1, the central processing unit 1 is the principle portion of the data processing unit for the manipulation of information signal groups. The central processing unit includes a central unit for sequencing the entire unit and further includes a cache unit and an instruction unit. The cache unit obtains instruction signal groups and data signal groups from main memory unit 3 through the control interface unit 2. Instruction signal groups are retained in an instruction cache, operand signal groups in an operand cache and paging information in a paging buffer. The instruction unit stores prefetched instructions and signal groups in an instruction stack. The instruction represents the current instruction stream and prefetch alternate streams or indirect words predicted by the batch table. The instructions are decoded and operand or branch target instruction addresses generated in a pipeline which accepts instructions for an instruction stack. The final stage of the pipeline sends instructions and operands to one of a group of specialized execution units. The pipeline, address adder and instruction stack can be considered another logical execution unit, which handles transfer class instructions as well as instruction address, or state-related situations.

The main memory unit 3 provides the central processing unit 1 with the principle storage of information signal groups used by the central processing unit. The information signals are entered into or extracted from the main memory unit under control of the control interface unit 2.

The control interface unit 2 controls the transfer of information signals between the main memory unit 3, the input/output multiplexer 4 and the central processing unit 1. Thus, the control interface unit 2 prioritizes requests to the control interface unit and prioritizes the output to the input/output unit multiplexer. The control interface unit 2 provides a buffer unit for information signals transferred therethrough. In addition, the control interface unit 2 controls the queque for system interrupts under which words are stored in the main memory unit as well as other interrupt activity. The error detection and correction processes for data transferred into and out of the main memory unit 3 are contained in the control interface unit 2. The output interface unit also provides apparatus to insure that no block access conflict exists among hierarchy commands.

The input/output multiplexer 4 is utilized to satisfy the throughput requirements of the data processing system. The operating system prepares the required control words and assigns a buffer area for the data to be transferred. After the control words are prepared, the operating system initiates an input/output activity by issuing a connect instruction. The control interface unit 2 recognizes the connect instruction and passes the connect information to the input/output multiplexer controller. The input/output multiplexer retains the mailbox address and other pertinent information from the connect control word in the addressed channel's scratchpad memory and passes the connect command to the addressed channel in a channel adapter unit 5.

The addressed channel notifies the identified peripheral device that a channel program is waiting. After notification to the identified peripheral device, the channel adapter unit 5 requests the input/output multiplexer to pull the channel mailbox. In response to this request, the input/output multiplexer loads the first eight words of the channel mailbox into scratchpad memory. The channel program subsequently requests the input/output multiplex to 'move pointer forward'. In response to this request, the input/output multiplexer performs a list service and sends the Instruction Data Control Word (IDCW) to the channel adapter unit 5. The first DCW of the channel program must be an IDCW. The channel adapter unit passes the IDCW to the peripheral device and, on demand from the peripheral subsystem, requests a data list service. Using the List Pointer Word (LPW) from the channel mailbox, the input/output multiplexer retrieves the next DCW. The input/output multiplexer retains the DCW in scratchpad memory and sends the pertinent information from the DCW to the channel adapter unit 5. With the DCW information, the channel adapter unit 5 requests the necessary data services to satisfy the channel program. The input/output multiplexer 4 executes the data services by maintaining the current DCW and LPW in scratchpad memory and performs any required list services for additional DCW's. After the channel program has been satisfied, the channel requests a status store service. The input/output multiplexer 4 places the termination status in the channel mailbox and restores the mailbox to memory. After completion of the status service, the channel requests a terminate interrupt service. In performing the service, the input/output multiplexer 4 interrogates the mailbox link word. If the interrupt inhibit bit is 'ON', the interrupt is not reported. If the interrupt inhibit bit is 'OFF', the interrupt is reported using the interrupt level specified in the mailbox link word. If the link word specifies a continuation, the input/output multiplexer issures a connect to the channel.

The channel adapter unit 5 provides the interface between the input/output multiplexer 4 and the peripheral subsystem 6. In addition to the activity described in relation to the input/output multiplexer, the channel adapter interface unit provides a logic implementation conversion, CML in the input/output multiplexer 4 and TTL in the channel adapter unit 5. The channel adapter unit 4 serves as a buffer device between the peripheral system 6 and the input/output processor, permitting the input/output multiplexer to transfer information efficiently and asynchronously with a multiplicity of peripheral system 6.

The peripheral system 6 can be any of that typical subsystem such as magnetic tape units, disc storage unit, terminal interfaces, etc. The perpheral subsystems serve as mass storage devices and devices to provide external communication with the data processing system.

Figure 3:
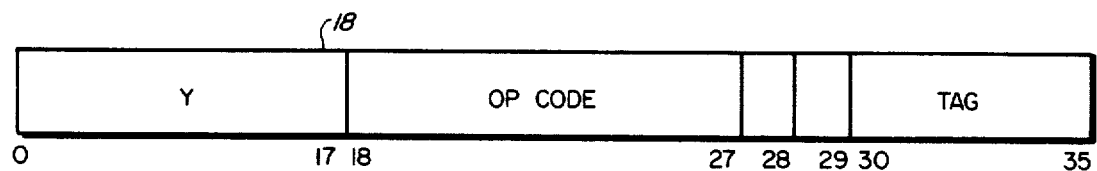
FIG. 3 is the format of a typical instruction stored in the data processing unit memory units.

Referring to FIG. 2, the major components, or subsystems, of central processing unit 10 of a large-scale general-purpose digital computer are illustrated. The central processing unit 10 can be an implementation of the central processing unit 1 of FIG. 1. The central pipeline unit, or structure, 12 controls the overall operation of processing unit 10. The instruction fetch unit 14 supplies, or transmits, the address of instruction words to instruction cache 16. In response to the receipt of an instruction address by instruction cache 16 from instruction fetch unit 14, an instruction double word is transmitted from cache 16 to instruction fetch unit 14 which stores, or accumulates, a series of instructions in an instruction stack which is a part of the instruction fetch unit 14. The central pipeline unit 12 obtains the instructions in program order from the instruction stack of instruction fetch unit (IFU) 14, preferably one per clock period of the system clock of processing unit 10. The central pipeline unit structure 12 is a 5-stage pipeline in which in the first stage the operation code, bits 18–27 of instruction word 18 illustrated in FIG. 3, is decoded and formation of the operand's address is started using the 18 bits denoted Y in FIG. 3, bit positions 0 through 17, bit 29 and the 6 bits denoted as TAG in FIG. 3. In the second stage, the address formation is completed. In the third and fourth stages, the directory of operand cache 20 is searched to determine if the operand is located in the operand cache 20, and the operand is accessed or obtained from the cache data storage. However, if the operand is not stored in the cache, then a block of eight words which contains the operand is fetched from main memory 51 and stored in the operand cache after sending the desired operand to the distributor. In the fifth stage, distributor 22 distributes, or dispatches, each instruction and its operand to the appropriate execution units, such as the central execution unit CEU 24, the virtual memory and security manager VMSM 26, the binary arithmetic execution unit BINAU 30, or the decimal character unit DECCU 32. In addition, the instructions and other relevant information, as will be described hereafter, are transmitted in program order to the instruction execution queue 18.

Each of the execution units 24, 26, 28, 30, is capable of receiving instructions and operands and of processing them independently of the other execution units. Each of the execution units 24, 26, 28, 30, includes logic circuits which are optimized for performing the set of instructions assigned to it. In the preferred embodiment, central execution unit 24 performs basic computer operations, such as simple loads, adds, subtracts, etc., and certain miscellaneous instructions. The central execution unit 24 is unique among the four execution units 24, 26, 28 and 30 in that it executes each instruction as received, usually within one clock period. As a result, the central execution unit 24 is not provided with an input stack as are the other execution units illustrated in FIG. 2. The virtual memory and security manager unit 26 executes instructions relating to virtual memory, security and special instructions that are peculiar to a secure operating system. This unit also provides a composite descriptor for each descriptor provided to the central processing unit. The BINAU execution unit 28 executes binary arithmetic instructions, such as multiply, divide and floating point instructions. The decimal/character execution unit 30 executes alphanumeric, decimal arithmetic, and bit string instructions. Execution unit 26 is provided with, or has associated with it, an input stack 32; execution unit 28 has provided with it an input stack 34; and execution unit 30 has two input stacks 36 associated with it. The function of input stacks 32, 34 and 36, is to store the operation code and operands of the instructions awaiting execution by each input stack's associated execution unit.

Each of the input stacks 32, 34 and 36, is a conventional first-in, first-out stack having 16 levels, with each level adapted to store a double data word. In the preferred embodiment, each word has 36 bits so that a double word has 72 bits. In addition, an execution code derived from the operation code of the instruction word to be performed or executed is stored with the operand in the input stack. The input stacks 32, 34 and 36 of execution units 26, 28 and 30 are fifo, or first-in, first-out stacks, so that the first operation code and operand required for each operation code applied to a given execution unit is the first one read out of the input stack for execution by that unit. Each of the execution units is also provided with a results stack. Results stack 38 is associated with the central execution unit 24, results stack 40 is associated with VMSM execution unit 26, results stack 42 is associated with the binary execution unit 28, and results stack 44 is associated with the DECCU execution unit 30. In the preferred embodiment, the results stacks are conventional first-in, first-out stacks, each of which has 16 levels. The results of the operation of an instruction are stored in the stacks in the order in which they are executed. Each level of a results stack has the capability of storing a double word, as well as additional information with respect to the double word. The operational code of each instruction word in execution, along with other information, is a part of an instruction execution queue word (IEQ) which is stored in the execution queue 18 which, in the preferred embodiment, is a conventional first-in, first-out stack of 16 levels.

An important feature of the central processing unit 10, from the standpoint of performance, is that both the operand cache 20 and the instruction cache 16, which together form a cache unit, and the main memory 51 perceive the address space as being composed of blocks of eight 36-bit words. All data transfers between the main memory and the caches 20 and 16 are in units of eight such words or blocks. Movement of data within the processing unit 10, particularly between the cache units and the execution units, is on a double word, or pair, basis and only the double word required is so moved. The distributor 22 supplies operands from the cache 20 to the various execution units and maintains multiple copies of the AQ register, one set for the central pipeline unit structure, the CUPS and BINAU only.

The instruction fetch unit 14 consists of an instruction prefetch pipeline of five stages. Instruction fetch unit 14 stores prefetched instructions and data in its instruction stack. The instructions represent the current instruction stream and one or more prefetched alternate streams or indirect words predicted by the transfer/indirect prediction table of unit 14. The instruction fetch unit supplies instructions to the central pipeline unit 12. In central pipeline unit 12, instructions are decoded during the I, or instruction, cycle of central pipeline unit 12. Instruction prefetch pipeline 14 does not examine the instruction operation codes of instructions prefetched by it, but rather uses the instruction count of its instruction counter register to search the transfer and indirect prediction table to determine if a given instruction is a branch to a new memory location or is an instruction requiring indirect addressing.

The instruction prefetch pipeline provides the instruction execution pipeline 12 with a supply of instructions to be executed. This is accomplished by use of a transfer and indirect prediction table to predict new instruction sequences and then to prefetch the instructions of the new instruction stream, two words at a time, from the instruction cache or occasionally from the operand cache and placing such instructions or indirect words in the instruction stack. Loading such new instruction sequences into the prefetch instruction stack occurs only if the transfer/indirect prediction table indicates that one such instruction of each pair was a successful transfer, or required an indirect cycle the previous time the instruction was executed. When this occurs, instruction prefetch pipeline 14 diverts the current instruction sequence to fetch the target word of the transfer instruction or indirect instruction. Otherwise, the instruction prefetch pipeline continues sequentially fetching instructions and placing them in its instruction stack. The instruction prefetch pipeline of instruction fetch unit 14 also returns to sequential prefetching if the predicted transfer instruction turns out to be a nontransfer when the instruction in question is actually executed. The prefetched transfer or indirect targets are available for processing by the central unit pipeline structure 12 as soon as they are fetched and stored in the instruction stack of the instruction fetch unit 14. Thus, it is not necessary to wait for the actual execution of a transfer or indirect instruction by the central pipeline structure unit to be completed before IFU 14 starts placing instructions of the new instruction stream in the instruction stack of IFU 14. In this way, the effective execution time of transfer instructions and instructions with indirect operands is minimized.

The instruction prefetch pipeline operates in five cycles in a manner similar to the five cycles of the central pipeline unit 12. One difference is that IFU 14 disposes of instructions by placing them in its instruction stack a double-word pair at a time whereas CUPS 12 disposes of instructions one word at a time by forwarding them to central execution unit 24 or to the input stacks of the execution units 26, 28, and 30. Another difference is the IFU 14 checks with its transfer/indirect prediction table to determine if a transfer or indirect address is to be executed, whereas the central pipeline unit structure updates the transfer/indirect prediction table of IFU 14. During the first cycle or stage of the instruction prefetch pipeline of IFU 14, the instruction counter of central processing unit 10 is incremented by two. During the second cycle, the address of an instruction pair is distributed to the transfer/indirect prediction table and the instruction/operand caches. During the third cycle, the transfer/indirect prediction table and instruction cache 16 are accessed. The instruction cache access consists of a set of double words, four in the preferred embodiment, plus a physical page address denoting the physical system memory location associated with these double words. During the fourth cycle, the physical page address of the desired instruction pair is compared with the page address of each of the cache-addressed double words. If a match occurs, the double word associated with the match is selected as the instruction double word. If no match occurs, the operand cache is searched for the instruction double word. If the instruction double word is found neither in the I cache not the O cache, an 8-word block containing the desired instruction double word is fetched from the main memory 10 and placed in the instruction cache.

The transfer/indirect prediction table is accessed in order to see if either or both of the instructions being accessed is predicted to be a transfer/go instruction during the compare/select or fourth cycle. The instruction pair is selected from one of the four cache levels corresponding to a match of the real page number from the directory of the current instruction stream. The instruction pair read out of the cache is saved in an instruction fetch register, the real page number is saved, and the response from the transfer/indirect prediction table is checked to see if either of the instructions is recorded in the transfer/indirect prediction table as a transfer/go. Note that the response from the transfer/indirect prediction table arrives two cycles after it is interrogated. During the execution cycle, the fifth cycle of the prefetch instruction pipeline, the instruction pair is placed in the instruction stack so that, if the transfer/indirect prediction table indicates that either of the instructions is a transfer, the instruction prefetch pipeline will prepare to fetch instructions from the new instruction stream. The timing is such that up to two extra double-word pairs from the current instruction stream will also be read from the cache. In the event the predicted transfer/go turns out to be a no go, the extra double-word pairs are still available in the instruction stack. Pointers associated with the instruction stack enable central instruction prefetch unit 12 to read instructions out of the instruction stack in the correct sequence, or in program order.

The instruction stack functions as an instruction queue between instruction prefetch unit 14 and the instruction execution unit or central unit pipeline structure 12. In the preferred embodiment, the instruction stack is 15-levels deep. Once instructions or indirect words are placed in the instruction stack by the instruction fetch unit pipeline structure, they remain until they are executed or until it is determined that they are not to be executed. In the case of a transfer instruction or instructions requiring an indirect word for which a history is found in the transfer/indirect prediction table during prefetch, the instruction stack control contains a pointer to the instruction stack location holding the address of the target instruction, or of the indirect word. The instruction stack is a cyclic round-robbin stack. There is a sixteenth entry which is used to buffer instruction double-word pairs. Instructions and indirect words or operands flow from the instruction stack of IFU 14 to the central pipeline unit structure 12 through the base instruction register of central unit 12 a single word at a time.

Central pipeline unit 12 also has five stages or cycles. In the first, the operation code of the instruction is decoded and formation of the operand address is started; in the second, the operand address is completed; in the third, the address is converted from a virtual memory address space representation to the actual physical address space representation, and a set of candidate operands is accessed from the operand cache along with the physical page number identifying the system memory location from which each of the operand candidates was accessed; in the fourth, the operand page number portion of the physical address is compared with the page number associated with each of cache accessed operand candidates and assuming there is a match; in the fifth, the selected operand and execution command code is transmitted to the execution unit uniquely capable of performing the instruction. It should be mentioned that some of the activities carried out are skewed across the pipeline stages as defined. It is the central pipeline unit structure 12 that makes entries into the transfer/indirect prediction table of IFU 14. Whenever the central pipeline unit structure executes a transfer-go instruction, the central pipeline unit structure 12 verifies any corresponding entry which may be in the transfer/indirect prediction table. If a predicted transfer turns out to be a no-go or nontransfer, then that entry in the TIP table is deleted. In the case of an impure procedure, for example, the target address of the transfer instruction has been modified, but the operational code still remains a transfer; the appropriate entry in the transfer/indirect prediction table is corrected to reflect this fact. In the event of a transfer-go not previously recorded, a new entry is made in the TIP table which may displace another entry should all four levels corresponding to the instruction counter for that particular instruction be occupied. The displacement algorithm is random since there is little benefit in adding the necessary complex circuitry to displace the least recently used entry because of the infrequency of transfer/indirect prediction table misses. The central unit interacts with the transfer/indirect prediction table in other ways. In the case of impure procedure where the operation code is changed but the transfer/indirect prediction table predicts a transfer, the central pipeline unit structure 12 will detect the fact in the instruction cycle where the instruction is first decoded. In the case of indirect instructions, the central pipeline unit structure 12 also makes an entry into the transfer/indirect prediction table for these. The instruction execution pipeline 12 has the critical role in central processing unit 10 in achieving the necessary high levels of performance as any interruptions due to data not being in the cache unit, unexpected transfers, etc., will halt the operation of the central pipeline unit until such occurrences are remedied.

The transfer/indirect prediction table consists of 4,096 entries which are divided into 1,024 sets of four entries each. The TIP table serves to record the target address for the first level of indirection and also to predict the target address for both conditional and unconditional transfers. During the first execution of a successful; i.e., transfer-go instruction or an instruction requiring an indirect word, there will be a break in the pipeline of the central pipeline structure, while the target address is formed and the target accessed from the cache. On the first execution, information is prepared for the transfer/indirect prediction table defining the location of the target instruction in the cache unit. During the next prefetch of the transfer instruction or instruction requiring an indirect word, the prefetch pipeline accesses the transfer/indirect prediction table and determines the target location in order to also prefetch the alternate instruction stream or indirect word. Checking the transfer or indirect instruction occupies only one clock period of the central pipeline unit in order to verify that the prefetch target address has not changed. During subsequent executions of any transfer instruction, the transfer/indirect prediction table entry is updated only if the transfer does not go as expected. The transfer/indirect prediction table keeps track of only one level of indirection. The cache addresses of indirect words are put in the TIP table only if the indirect words are not modified.

The cache unit consists of two separate 8K caches, instruction cache 16, and operand cache 20. Data is maintained in each cache on an eight-word block basis. A block consists of eight consecutive 36-bit main memory words, the first word of which has an address of 000 in binary notation. A reference to any word in a block causes the entire block to be read from main memory, unless the block is already in the appropriate cache. Any block in a cache is retained until it is displaced by another block or until it is cleared from the cache by a cache clearing instruction. The instruction cache 16 holds blocks of unmodified instructions and indirect words, while the operand cache holds blocks of operands, modified instructions and indirect words. Operand data cannot be fetched from the instruction cache nor can data be modified in the instruction cache. It is, however, possible to fetch instructions from the operand cache, but the normal and desired mode of operation is to fetch instructions from the instruction cache only. If a block which is contained in the instruction cache is referenced for a store or data fetch operation, that block is cleared from the instruction cache and refetched from main memory 51 and placed in the operand cache 20. In summary, operands are fetched only from the operand cache and they may be stored only into the operand cache. Instructions may be fetched from either cache, but there is a performance preference for the instruction cache.

Each cache has a four-level set associate directory for the accompanying storage for 8K 36-bit words. Each cache is organized as 256 rows of four 8-word blocks. The first eight words of physical memory map onto the first row of the cache, row 0. Words 8 through 15 on the second row, row 1, etc., with words 2,040 to 2,047 mapping onto the last row, row 255. Each successive 2K of physical memory maps onto the cache in a similar manner. Hence, the cache row number of an eight-word block is known from its physical memory address. Since each row has space for four 8-word blocks, in four levels, the levels for a particular row in a given cache unit will be filled before there is a contention for space in that row. After all levels in the row have been filled, older blocks in the row are displaced on a least recently used basis. Thus, five hits to the same row are required before an incoming block of eight words can displace a prior block of eight. If an eight-word block of instructions is in the operand cache, instruction prefetch unit 14 can fetch the instructions from the operand cache a double-word pair at a time, but without removing them from the operand cache. Usually, the instruction prefetch unit 14 runs far ahead of the instruction execution pipeline of the central pipeline unit structure 12, so this penalty is not always visible, but such a situation can cause an instruction prefetch pipeline to fall behind, in which case the lack of the proper instruction will result in a break in the pipeline of the central pipeline unit structure. Performance is enhanced by a store into cache as distinguished from a store through cache. All store operations go to the operand cache, but do not immediately go to main memory 51, although displacing the block in which the store occurred will force the writing of that block to main memory 51 (i.e. main memory unit 8 in FIG. 1). If the block being stored into is already in the operand cache and control information indicates that the eight-word block has already been modified, then the store is completed to the operand cache and no further action is taken. However, if the block is found in the operand cache, but has not yet been modified, central processing unit 10 notifies the control interface unit 2 associated with that block that the block is being modified. The control interface unit then issues a write notification to any other central processor units which may be present. These must then invalidate any copies of the eight-word block which they might have either in their operand cache or conceivably in their instruction cache. When a data block is not found in the operand cache on a store operation, the block is fetched from memory. Central processing unit 10 indicates to the control interface unit 2 that the fetch is for the purpose of modifying the block so that, when the processor receives the block, the block can be modified without any further communication between units. Only read cache misses cause the pipeline of the central pipeline unit structure to wait for data. On store cache misses, the pipeline continues without waiting for data.

Each cache has a duplicate directory, so that, when a system request is received to either clear a block or to transmit a block to system memory, the processor can search its duplicate cache directory to determine if the block is present without interfering with the operation of the central pipeline unit 12. If the requested block is found, then the processor takes the appropriate action. Otherwise, the duplicate directory responds to the request and the processor is not delayed.

The central unit pipeline structure 12 forwards the operation code of each instruction as it is received, in program order, to the instruction execution queue 18 for storage therein. Up to sixteen instruction execution queue IEQ words can be stored in queue 18. Collector control 47 uses the operation code of each IEQ word to control the reading out of the results located or stored in the results stacks 38, 40, 42 and 44 of each of the execution units 24, 26, 28, and 30, so that the results in proper program order can be stored in either the master safe store MSS 48 or into store stack 50. Results that are stored in store stack 50 are for writes of operands to memory. Instructions which change program addressable registers of central processing unit 10 generate results that are stored in the master safe store 48 so that at such time as an interrupt, a fault, or a hardware error occurs, the contents of the program addressable registers of the central processing unit 10 are available in master safe store 48. The availability of current and valid contents of all program addressable registers greatly facilitates fault recovery, handling of interrupts, and retrying of instructions as appropriate. The main memory 51 of the data processing system of which the central processing unit 10 is a subsystem provides instructions for the instruction cache 16 and operands for operand cache 20. All stores or writes to main memory 51 are from data stored in the operand cache 20. Thus, whenever data is to be written into memory as a result of an execution of an instruction, the necessary data, operands, are stored in store stack 50 in program order and are issued or written into the operand cache 20 in program order. As a block of operand cache 20 is released so that new data can be written into that block, the operand cache control will have data in that block of cache written into main memory 51 before new data is written into that block.

The central pipeline unit 12 controls the overall operation of processing unit 10 and has the function of sending operation codes or commands and associated operands to the various execution units 24, 26, 28, and 30, where the actual execution of each operand code is performed. Instruction fetch unit 14, under the control of the central pipeline unit 12, fetches instructions primarily from the instruction cache 16 and loads up to sixteen pairs of instructions in an instruction stack which is a part of unit 14. The central pipeline unit structure 12 obtains the instructions from the instruction stack of the instruction prefetch unit. The central pipeline unit 12 prepares the addresses of the operands in a series or sequence of five steps from the operand cache and sends the operation code and the operands to whichever one of the execution units 24, 26, 28, or 30, which has the capability of executing the same. Within the central pipeline unit structure 12 is performed the instruction preprocessing, instruction decode, operand address formation, including paging and search of an associative memory of the operand cache.

The execution units 24, 26, 28, and 30, receive commands from the central pipeline unit 12 and operands from the operand cache 20 which are distributed by distributor 22 to the various execution units. The execution of an instruction generally involves the formation of some result based upon current register contents and the input operand which produces a change to a program visible register or to memory.

Central processing unit 10 is provided with four major execution units, each of which is made up of one or more subunits. These units are the central execution unit 24, the binary arithmetic unit which performs floating point and multiply and divide instructions BINAU 28, the decimal character unit DECCU 30, and the virtual memory and security manager unit VMSM 26. Each of the execution units 24, 26, 28 and 30, receives instructions and operands, and then processes them independently of what any of the other execution units may be doing. Execution units 26 and 28 each have an input stack 32 and 34, a sixteen-level fifo stack with each level of the stack capable of holding one double word. Execution unit 30 has two sixteen-level fifo stacks 36, each capable of holding one double word. A double word in the preferred embodiment comprises 72 bits plus parity bits.

In addition, each execution unit has an associated command stack. Execution units 26 and 28 can hold up to 16 commands awaiting execution while execution unit 30 can hold up to 4 commands awaiting execution. It should be noted that the decision as to which execution unit received or is assigned a given instruction and its associated operand is determined by the central pipeline unit 12 by examining the operational code of each instruction. The particular method used in the preferred embodiment is a conventional table lookup technique. Input stacks 32, 34 and 36, allow the central pipeline unit structure 12 to issue operands and associated operation codes to the execution units at a maximum rate of one per clock period, without waiting for the completion of the execution of preceding multiple execution cycle instructions, for example. Such an arrangement also allows execution of instructions in the different execution units to be overlapped. Each instruction code is always executed in the order it is received from the central pipeline unit 12. The system architecture of processing unit 10; i.e., having several execution units, requires that several copies of the major registers, for example the A and the Q, be kept. As processing proceeds, the valid copy of a particular register may be in any one of the execution units or in any of several different register banks within processing unit 10. Central pipeline unit structure 12 maintains a record of the currently valid copy for each register and recognizes when the execution of the next instruction requires transferring a copy of the contents of a register from one execution unit to another. However, maintaining a valid copy of the contents of a particular register is complicated by the length of pipeline 12, which is five instructions or clock periods deep. The ability to determine the contents of each addressable register immediately prior to the occurrence of a fault is a requirement for prompt recovery from a fault.

In any pipeline computer, processing of any one instruction is overlapped with the processing of several other instructions in different stages of execution. In addition, in central processing unit 10 several instructions may simultaneously be executed in different execution units. As a result, at any one time, the registers of pipeline 12 and of execution units 24, 26, 28, and 30 can contain register changes resulting from the processing and, execution of several different instruction codes. When an instruction program fault, instruction processing error, or an interrupt occurs, the collecting apparatus including units 38, 40, 42, 44, 70, 18, 47, 48 and 50 must be halted at the end of the last successfully completed instruction. All register changes as a result of the execution in program order of instructions prior to the fault, error, or interrupt should be completed and any program visible register change or changes to memory as a result of execution of later in program order instructions must be cancelled or deleted. The collecting apparatus provides a valid, current copy of each of the program addressable registers to facilitate fault and error recovery and for handling interrupts. A record of the proper program order for all instructions in execution being processed by central processing unit 10 is maintained in instruction execution queue 18. Instruction execution queue 18 contains one entry for every instruction in process. Entries into the master safe store 48 and into store stack 50 are ordered so that they are unloaded in proper program order; i.e., the same order or sequence in which the instructions are stored into the instruction execution stack 18 by the central pipeline unit's distributor 22. The instruction execution queue words contain the operation code of the instruction and identify by means of a table lookup technique the execution results stack in which the result of that instruction when executed is, or will be, entered. The result of each instruction executed is then transferred from the appropriate results stack to master safe store 48 or to store stack 50 in program order. Thus, in the collecting apparatus, instructions are completed and the results of each are received and arranged in the proper or program order. The collecting apparatus also performs the actual execution of all memory store instructions. Master safe store 48 contains a copy of all program visible registers so that it is a convenient place to obtain the contents of program visible registers which are to be written into memory. Handling store instructions in the collecting apparatus with the data to be written into memory 51 coming from either master safe store 48 or the execution units' results stacks via store stack 50 maintains program order and avoids the necessity for the execution units 24, 26, 28 and 30 from being involved in store instructions. Thus, in this sense, the collecting apparatus is another execution unit for processing store instructions. As a result, simple stores can be overlapped with the execution of other instructions taking two or more clock periods. The information stored in the master safe store 48 makes it relatively easy for the central processing unit 10 to retry hardware instructions where deemed necessary.

Referring next to FIG. 4A, 4B, 4C, and 4D, examples of descriptors used by various operating systems as well as the composite decor descriptor are shown. The descriptor for the basic decor is shown in FIG. 4A. This descriptor includes two 36 bit data fields. In the first data field, bits 0–7 represent a base number, bits 9–16 represent a bound number and the remaining bits are not relevant to this discussion. In the second data field bits 10–17 are the extension number and the remainder of bit positions are not relevant to this discussion. In FIG. 4B, the virtual decor descriptor including two 36 bit fields are shown. In the first 36 bits, bits 0–19 represent the bound, bits 20–28 represent flags, bits 29–31 are the working space register (WSR) and bits 32–35 are the type of descriptor. In the second 36 bit field, all bits are used to represent a base address. In FIG. 4C, the Multics decor descriptor is represented by two 36-bit fields. In field one, bits 0–25 are the page table base address, bit 26 is a flag and bits 27–35 have ring-access information. In the second field, bits 0–7 represent the bound, bits 30–35 represent flags and the remaining bit positions are not relevant. In FIG. 4D, the composite decor descriptor produced by the VMSM unit includes a 36 bit field and a 38 bit field. In the first field bits 0–19 are a bound number, bits 20–28 are flags, bits 29–31 are a working space register and bits 32–35 are a type of descriptor identification. In this second field, the entire 38 bit field is available for a base address.

Figure 5:
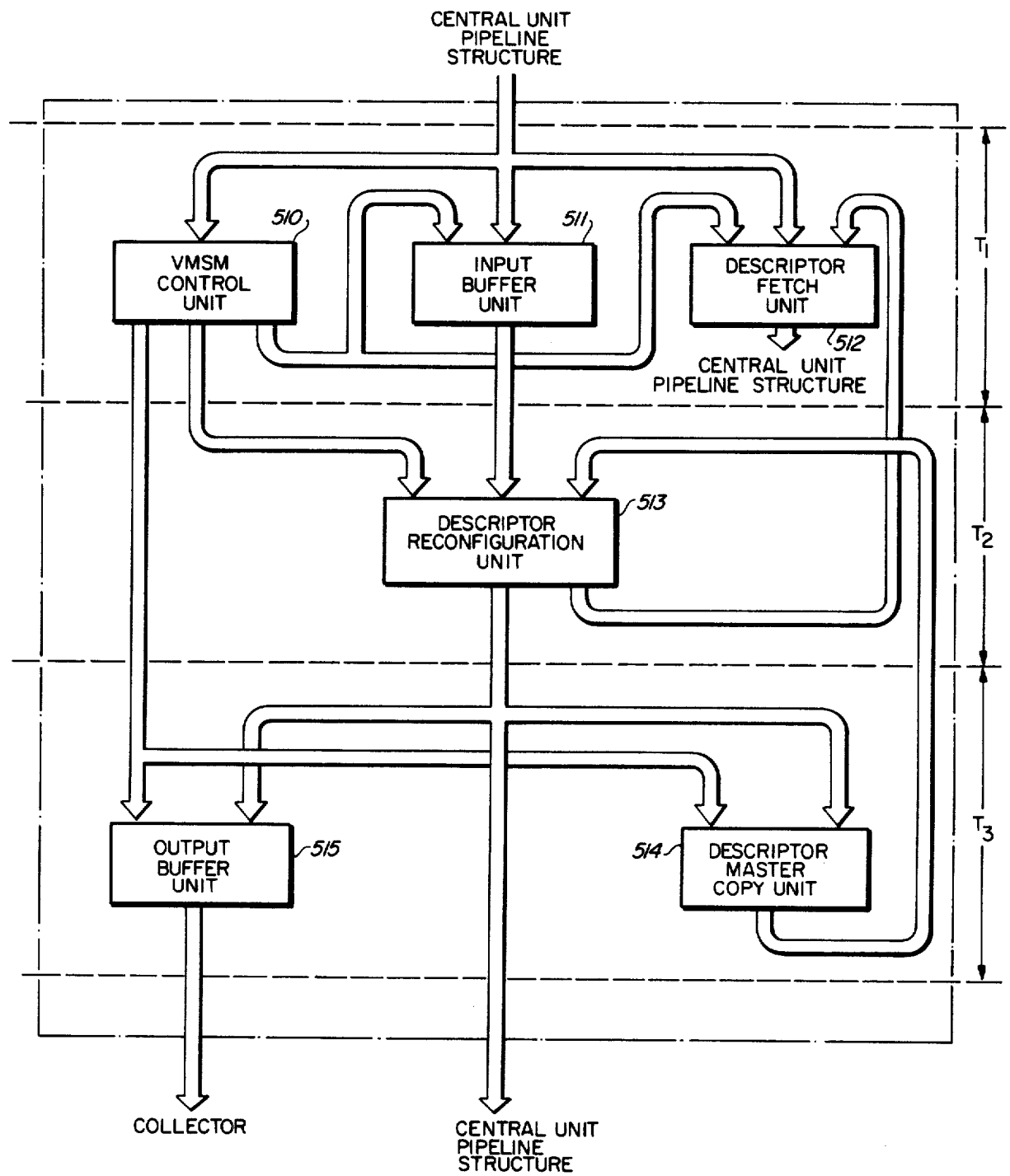
FIG. 5 is a block diagram of the principle components of the VMSM unit.
Figure 8:
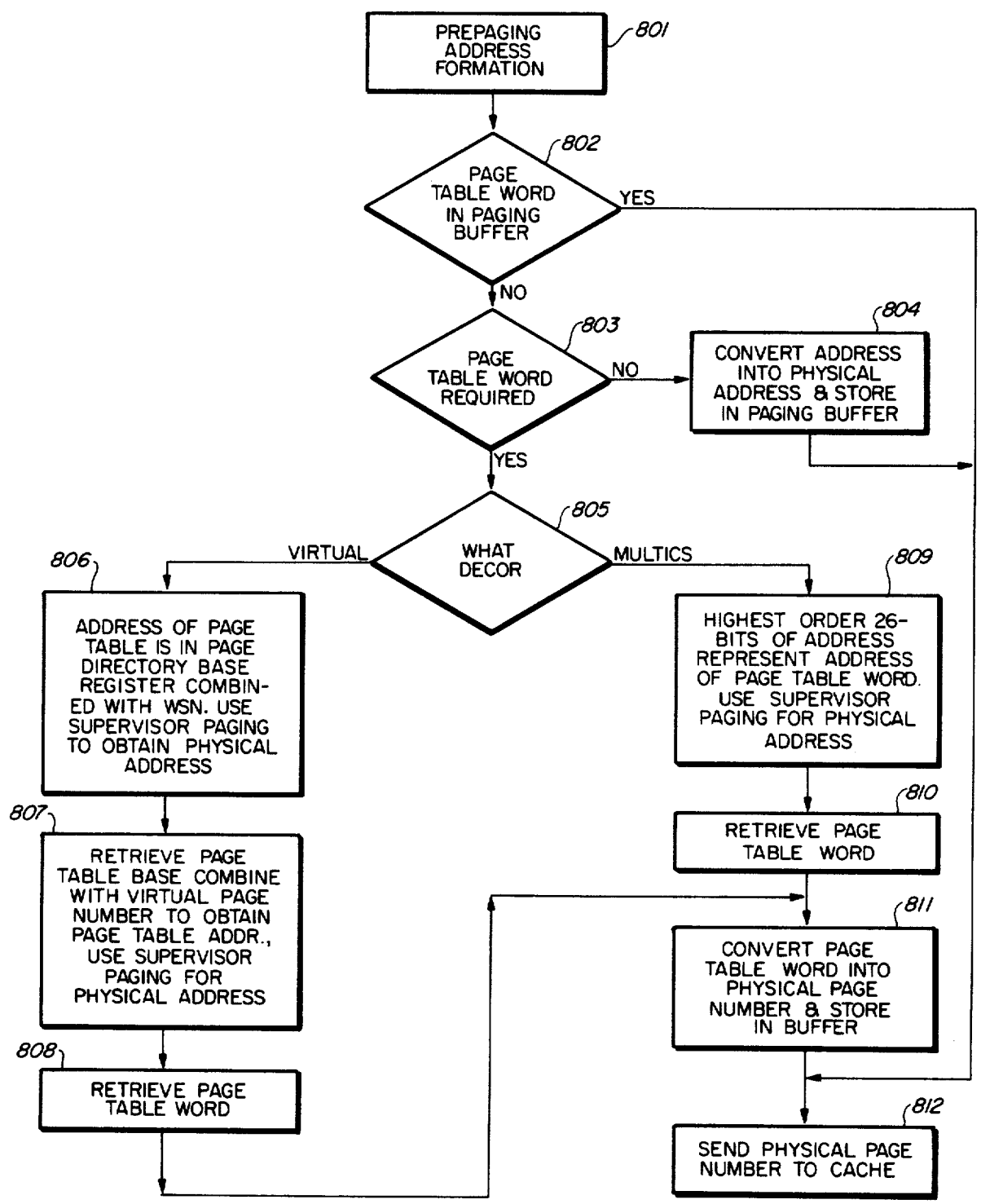
FIG. 8 is a flow diagram illustrating the difference between paging in the virtual decor and paging in the Multics decor.

Referring to FIG. 5, a block diagram of the VMSM unit is shown. A double word (2×40 bits, 36 bits plus parity) is transferred from the central unit pipeline structure to the VMSM unit and applied to the input buffer unit 511 and the descriptor fetch unit 512. The input buffer unit 511 consists of a first-in-first-out stack with 16 locations to synchronize the operation of the VMSM unit with the execution speed of the central unit pipeline structure and the VMSM unit. A 14-bit execution code is transferred from the central unit pipeline structure to the VMSM unit and applied to the VMSM control unit 510. The execution code is analyzed by the VMSM control unit 510. In general, three types of operands can be received by the VMSM unit, a descriptor, or a pointer to a descriptor, or a descriptor position update operand and the type of operand is uniquely determined by the given execution code. If a pointer to a descriptor is identified, the control unit 510 informs the descriptor fetch unit 512. The descriptor fetch unit, in response to the double word pointer and the signals from the control unit, creates a read instruction, and sends this instruction to the central unit pipeline structure to bring the descriptor referenced by the pointer to the VMSM unit. When the double word entering the VMSM unit is a descriptor, the control unit 510 analyzes the execution code to determine to which operating system the descriptor belongs. Having determined the decor to which the descriptor belongs, the control unit 510 adjusts the logic in the descriptor reconfiguration unit 513 in a manner determined by the identified decor. The original descriptor is thereafter reformatted into the composite descriptor format and applied directly to the addressing apparatus in the central unit pipeline structure (c.f. FIG. 8). After formation of the composite descriptor, this control unit 510 adjusts the logic in the descriptor reconfiguration unit 513 to generate the unformatted or decor-dependent descriptor. This generation of the unformatted descriptor is required to maintain the program-visible data formats associated with said descriptors. This unformatted descriptor generated by the descriptor reconfiguration unit 513 is then simultaneously applied to the output buffer unit 515 and the descriptor master copy unit 514. The output buffer unit 515 includes a first-in-first-out stack for providing for the non-synchronous operation of the components of the remainder of the central processing unit with the VMSM unit. The unformatted descriptor is then transferred to the collector for distribution to the data processing system. The descriptor master copy unit 514 is a content-addressable register bank containing a local copy of all the program-visible descriptor registers for use in the descriptor reconfiguration unit 513 of the VMSM. When a position update of the descriptor stack is identified, the descriptor master copy unit 514 which includes a copy of each descriptor, will be accessed and the described descriptor will be extracted and applied to the descriptor reconfiguration unit 513. The control unit 510 will have been informed of the request to update and will have prepared the combinatorial logic of the descriptor reconfiguration unit. The descriptor extracted from the descriptor master copy unit 514 will first be reformatted into the composite descriptor format and applied to the central unit pipeline structure addressing apparatus (c.f. FIG. 8). The logic in the descriptor reconfiguration unit 513 is then adjusted and the unformatted descriptor is produced. This descriptor is then applied to the output buffer unit 515 and the descriptor master copy unit 514 as previously described. The updated descriptor will be transferred to the output buffer unit 515 for transfer to the collector. In addition to controlling the combinatorial logic, the control unit 510 controls the apparatus sequencing, stack addressing and appropriate switch positions for sequencing of the pipeline operation of the VMSM unit as indicated by time intervals $T_1$, $T_2$, and $T_3$.

Referring next to FIG. 6A, 6B, 6C and 6D, a comparison of the address formation of the basic decor, Multics decor, virtual decor and the composite decor is shown.

In each decor, the initial address function to obtain an intermediate address referred to as the address, including the combination of the Y field from the instruction word, the AQX register determined by the tag field of the instruction word and the ARn register determined, in the preferred embodiment, by the three most significant bits of the Y field of the instruction word. The next step is to provide an intermediate address, referred to as the virtual address. Referring to FIG. 6A, the virtual address is formed by combining the effective address with a BAR field (obtained from the descriptor base field) and the BER field (obtained from the extension field of the descriptor) (c.f. FIG. 4A). Referring to FIG. 6B, the Multics decor address is formed by combining the effective address with a base field from the Multics descriptor base field (c.f. FIG. 4C). The virtual address includes a page number and a page offset. Referring to FIG. 6C the virtual address is formed in the virtual decor by combining base field (from the descriptor base field) and the working space number with the effective address. The virtual address includes an effective working space (EWS) field, a page number field and a word field. In FIG. 6D, the virtual address for the composite decor address formation is obtained by combining the effective address with the base field (obtained from the descriptor base field) and a working space number. The virtual address of the composite decor includes an effective working space field (EWS), a page number field and a word number field. In the preferred embodiment, but not illustrated, the virtual address of the Multics, virtual and composite decors are all paged to obtain a real address. For the basic decor, the virtual address is the same as the real address. In addition, in the preferred embodiment the page operation is performed on the real address to obtain the physical address, i.e., the address in the physical storage address space of the memory.

Figure 7:
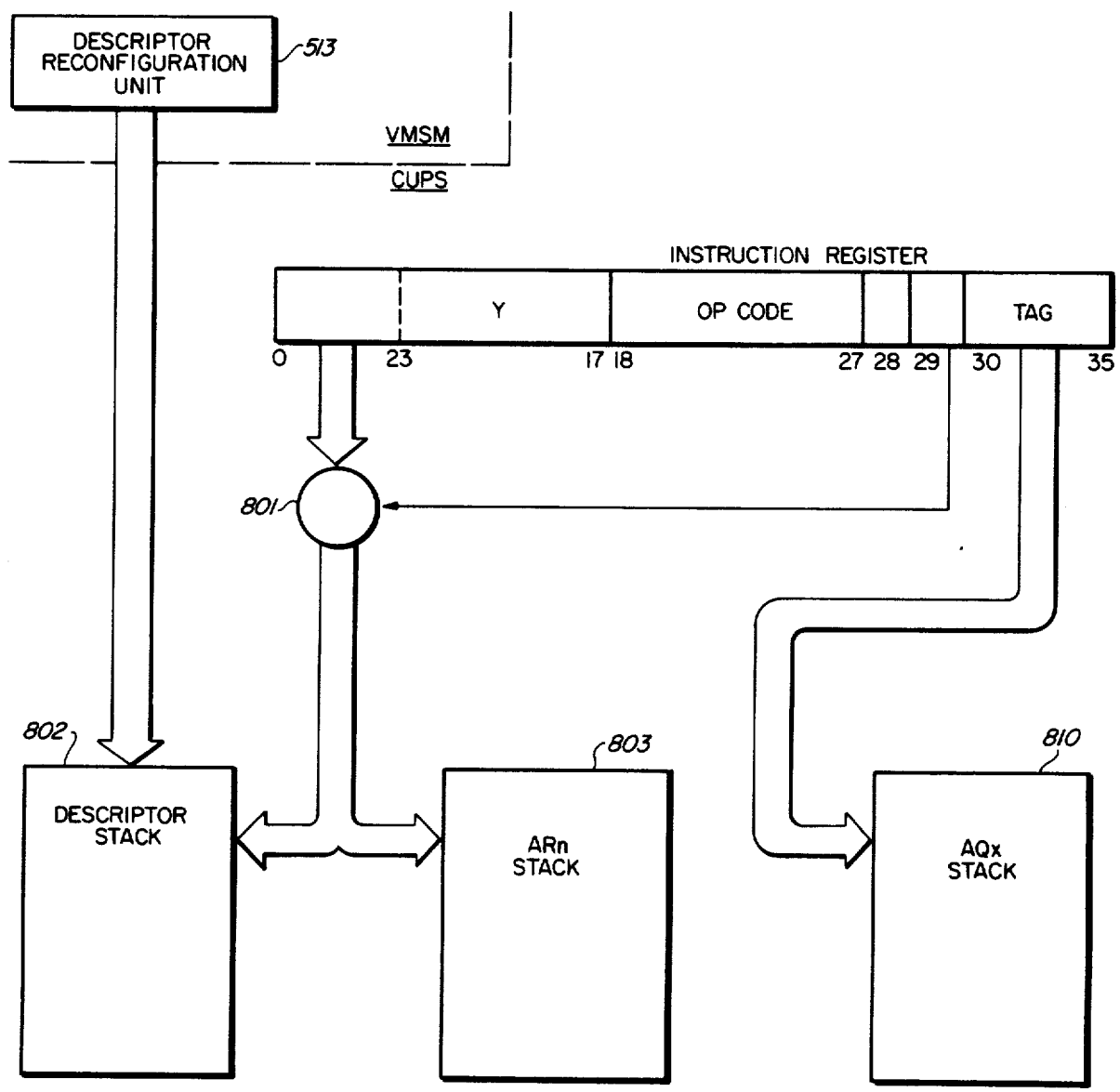
FIG. 7 is a schematic block diagram of the components of the VMSM unit.

Referring next to FIG. 7, a schematic diagram of the components for virtual address formation is shown. Instruction register 818 contains the Y address field. The highest order three bits of the Y address field are used to address a sixteen level descriptor stack 802 previously loaded with composite descriptors loaded from the VMSM and an eight level ARn stack 803. Bit 29 of the instruction word controls gate 801 to determine if the two stacks are actually addressed. Similarly bits 30–35 of the instruction word, referred to as the tag field control the accessing of the AQX 810 stack. The OP CODE contained in the field of bits 18–27 determine how the various fields will be combined to form the address. This figure illustrates the position of the descriptor stack for which the VMSM unit contains the descriptor master copy stack 626.

Each time that a descriptor is extracted from the main memory unit 3 and transferred to the central processing unit 1, the descriptor is reformatted by the VMSM unit into a composite descriptor format. In this manner, the data needed for address formation can be identified when it is needed. For example, the base address in the composite format is always in the same location. Therefore apparatus is not needed for each addressing scheme, but composite addressing mechanism, encompassing all descriptor formats is possible. Similarly other control attributes normally found in the descriptors, such as flags can find a standard position in the composite descriptor, allowing a composite apparatus, as distinguished from a decor-dependent apparatus to be used.

Various decors typically have variations in the way that the address formation is handled. An example of how possible variations are handled in the present invention is shown in FIG. 8. Referring to Step 801 a prepaging address activity has been performed. A decision must be made, Step 802, as to whether the page table word is in the page table buffer. If the page table word is not in the page table buffer, then the Step 803 determines if a page table word is required. If the page table word is not required, then the address that has been formed is now converted into a physical address by using a supervisor paging technique, and stored in the paging buffer. In the present apparatus, the physical address is kept in the page table word buffer so that the paging process will not be required a second time when the page table word is referred. Therefore, in Step 802, if the page table word was in the buffer then this address is already the physical address and it can be transferred to the cache for retrieval of the data from the indicated physical memory location. If the page table word is required, then Step 805 determines to which decor the instruction belongs. In the present example, paging in the Multics decor is a one-step process while paging in the virtual decor is a two-step process. In the Multics decor, after a determination has been made that this is a Multics decor address, then Step 809 accesses the highest order 26 bits of the address to represent an address of the page table word. However, to obtain the physical address, the supervisor paging must be performed. In Step 810, the page table word is retrieved from that memory and in Step 811, the page table word is converted to the physical address and stored in the buffer for future reference. The physical address is then sent to the cache for retrieval of data at the indicated location. In the virtual decor mode, Step 806 involves the address of the page table base which is formed by a combination of a quantity in the page directory base register and the use of the working space number. After these numbers are combined, the supervisor paging is used to obtain the physical address. In step 807, the quantity in the physical address, identified in Step 806, is retrieved from the page table base and is combined with the virtual page number to obtain a page table word. To obtain the physical address designated by this quantity the supervisor paging technique is used. In step 808, the page table word is retrieved from memory at the physical address formed from Step 807 and in Step 811, the page table word is converted to a physical address and stored in the page table buffer. The physical address is also sent to the cache for retrieval of the quantity at the indicated memory location in Step 812. Note, however, that in distinguishing the virtual decor address format and the Multics address formation in the paging mode, the only additional equipment that must be utilized in the instant invention is the page directory base register which provides the second level of paging in the virtual decor.

Figure 9:
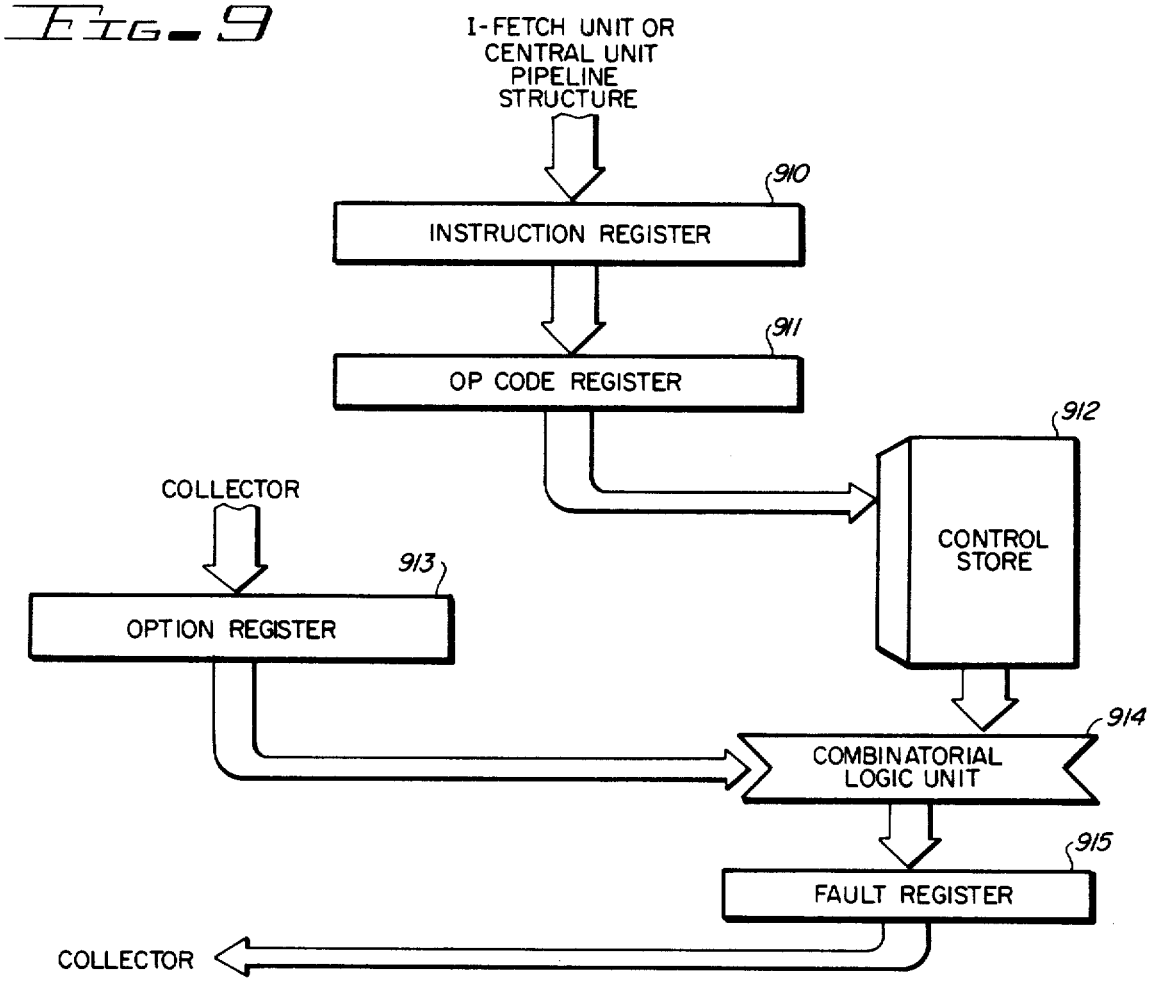
FIG. 9 is a schematic circuit diagram of the apparatus for controlling the execution by the central processing unit to permit instructions.

Referring next to FIG. 9, the apparatus by which the instruction associated with the currently active operating system is identified and a determination is made if execution of the instruction is permitted. An instruction is loaded into the instruction register 910 from either the I fetch unit or from the central unit pipeline structure. The portion of this instruction that is devoted to the operation code (OP CODE) is loaded into an OP CODE register 911. The OP CODE register is coupled to the control store 912 which is composed of a RAM memory and which provides the address for the locations of the RAM MEMORY. At each location in the control store is a three bit number that designates the operating system or systems permitted to execute the OP code instruction. It will be clear that there are overlapping areas between the instruction sets associated with the instruction repertoire of the various operating systems. However, the data in the control stores can be coded to take account of this overlap. Previously, and when the currently active operating system parameters are initialized in the central processing unit, the option register 913 has been loaded from the collector. The output of the option register is coupled to combinatorial logic unit 914. The purpose of the combinatorial logic unit is to ensure that the operating system or systems permitting execution of the instruction (in the instruction register) is the same as the operating system identified by the signals located in the designated portion of the option register. When the information in the option register and the information from the address location in the control store are not identical, a fault is located into fault register 915 and the output of fault register 915 is directed to the collector. In the collector the usual fault procedures are followed upon receipt of a fault condition.

Figure 10:
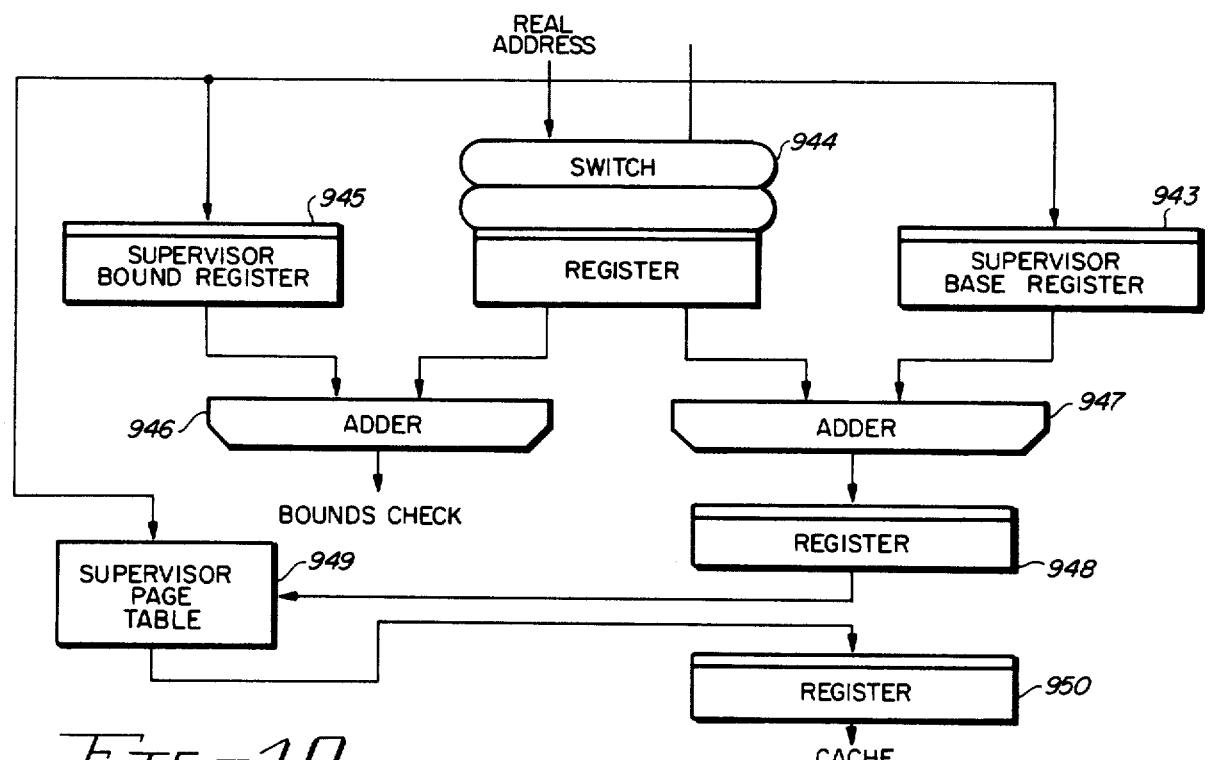
FIG. 10 is a schematic circuit diagram apparatus providing a final paging operation for the address formation.

Referring next to FIG. 10, the apparatus used to separate the physical memory allocated to the various operating systems is shown. During initialization of the operating system currently active in the data processing system, data is entered into supervisor bound register 945 and the supervisor base register 943. In addition, the supervisor page table is provided with the various physical address locations assigned to the various operating systems. During the actual address formation the real address is applied to switch/register combination 944. The contents of register and the contents of supervisor bound register 945 are combined to ensure that the resulting address does not exceed the limits allocated to the operating system. The real address contained in 944 is also combined in adder 947 with the data in the supervisor base register 943. The resulting address is applied to the supervisor page table directory 949. Basically, the number quantity in register 944 provides an offset to the base address provided by the supervisor base register. The address location in 949 is then stored in register 950 and is directed, along with the lower order address bit signals that are not required to identify the page, to the cache memory for operation on the physical memory location indicated by the formed address.

Figure 11:
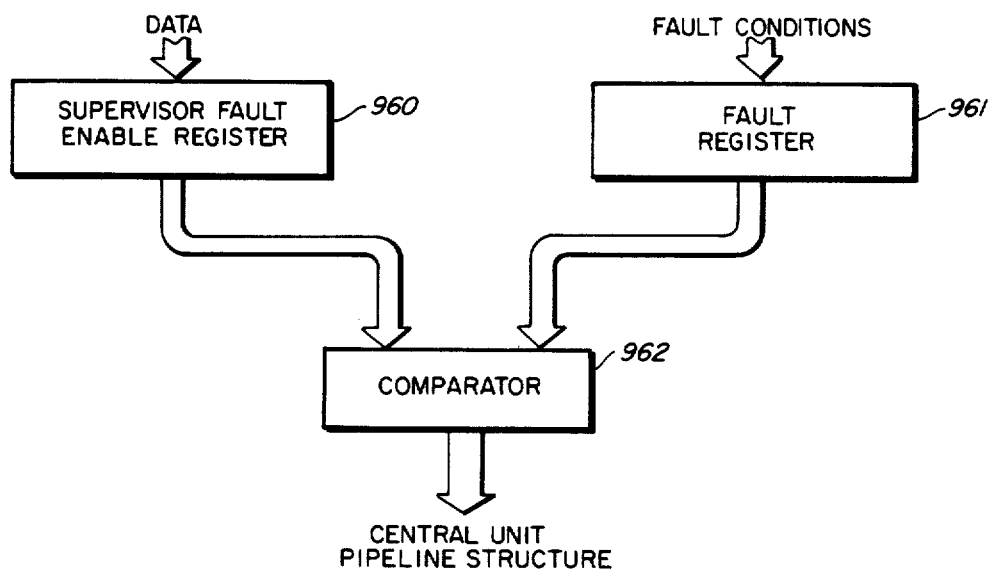
FIG. 11 is a block diagram of the apparatus related to a supervisor fault enable register.

Referring to FIG. 11, the use of the supervisor fault enable register 960 is shown. Fault conditions such as have been stored in register 915 are transferred to fault register 961. The contents of supervisor fault enable register 960, which has been loaded from a reserve memory location during initialization or reactivation, are compared with the contents of fault register 961. When a coincidence between the signals is identified by comparator 962, the presence of a fault requiring the supervisor procedures is communicated to the central unit pipeline structure for appropriate activity.

Figure 12:
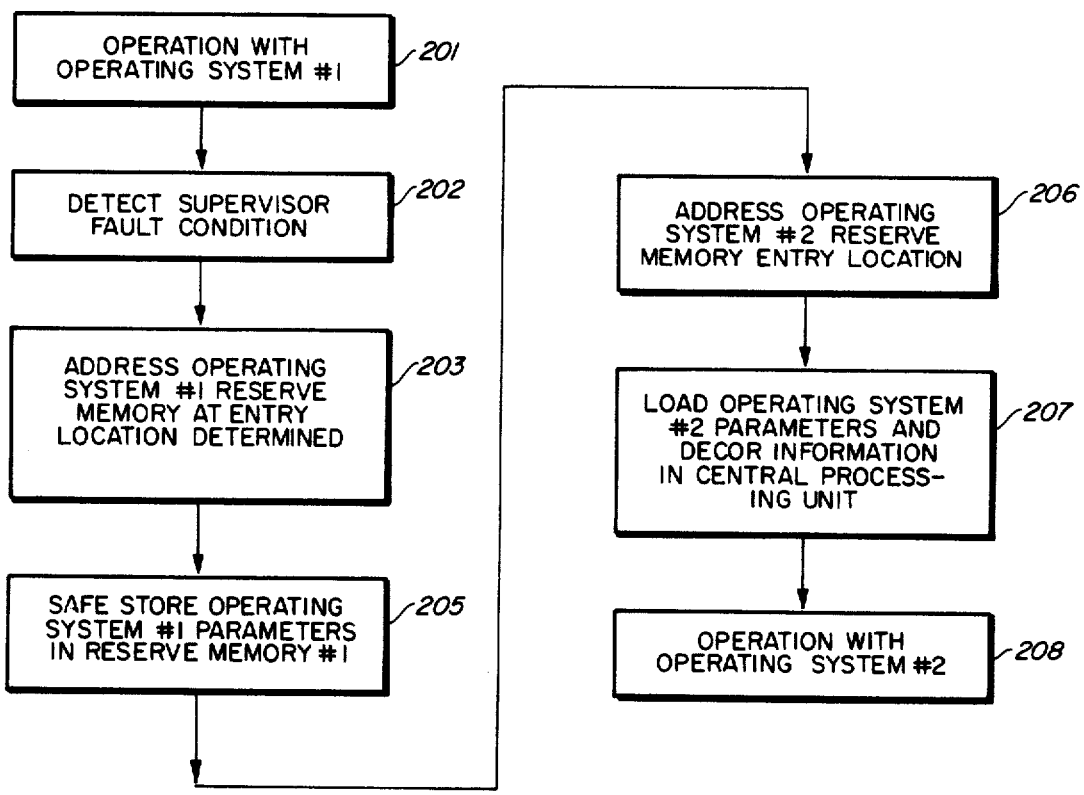
FIG. 12 is a flow diagram of the transfer of control of a data processing system from a first operating system to a second operating system.
Figure 13:
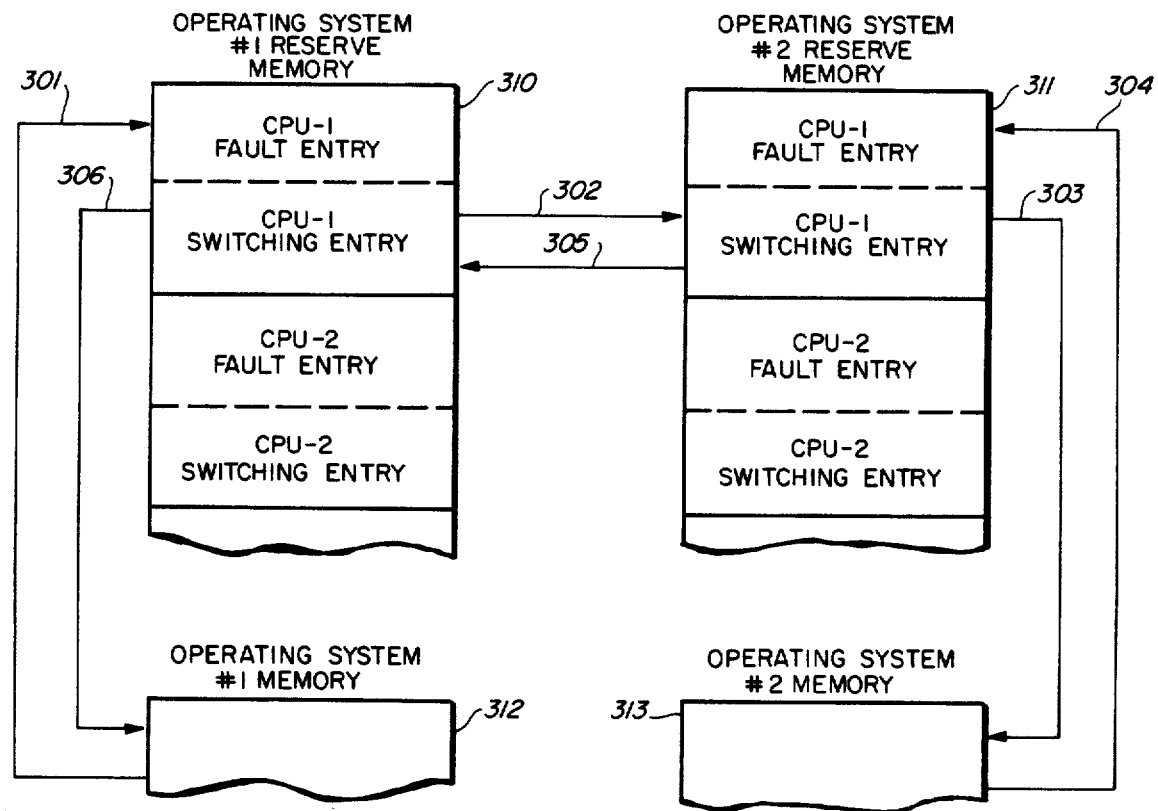
FIG. 13 is a schematic diagram of the use of selected memory files in transferring from a first operating system to a second operating system.

Referring to FIGS. 12 and 13, the steps in inactivating a currently active operating system (1) and activating another operating sytem is illustrated. In step 201, the data processing system is currently executing instructions under the control of operating system 1. A fault or interrupt condition for supervisor procedures is identified in step 202. The identified condition must be a preselected condition in which the result is an exchange of operating systems controlling the data processing system. The preselected fault or interrupt condition will cause a predetermined location in the reserved memory space of operating system 1 to be addressed indicated as step 203 in FIG. 12. This process is shown as path 301 in FIG. 13 from operating system 1 memory 312 to operating system reserve memory 310. The location in reserve memory has a series of steps, the most significant being the storage of register contents in the central processing unit, step 205, the register parameters will be stored in reserve memory so that upon restoration of operating system 1 as the currently active operating system, the data processing unit will be returned to this state. After execution of the fault entry programs, a location in switching entry section of the operating system reserve memory 1 is executed. The instructions in this location allow the operating system 2 reserve memory to be addressed in a location in the operating system 2 switching entry location, i.e., step 206. This transfer to operating system 2 is shown as path 302 in FIG. 13. The instructions in the switching entry portion of operating system 2 cause, in step 207, the stored parameters of operating system 2 to be entered in the appropriate registers in the data processing thus initializing the system or restoring the system to the last previous state of operating system 2. The final step 208 and path 303 transfers control of the central processing unit to operating system 2. In this manner, the control of the central processing unit 1 has been transferred from operating system 1 to operating system 2. In FIG. 13, paths 304, 305, and 306 illustrate the process by which control of the central processing unit 1 is transferred back to operating system 1. Also shown in FIG. 13 is the possibility that each operating system can control a plurality of central processing units. For that situation, the other central processing units will switch between operating systems in a similar manner.

Figure 14:
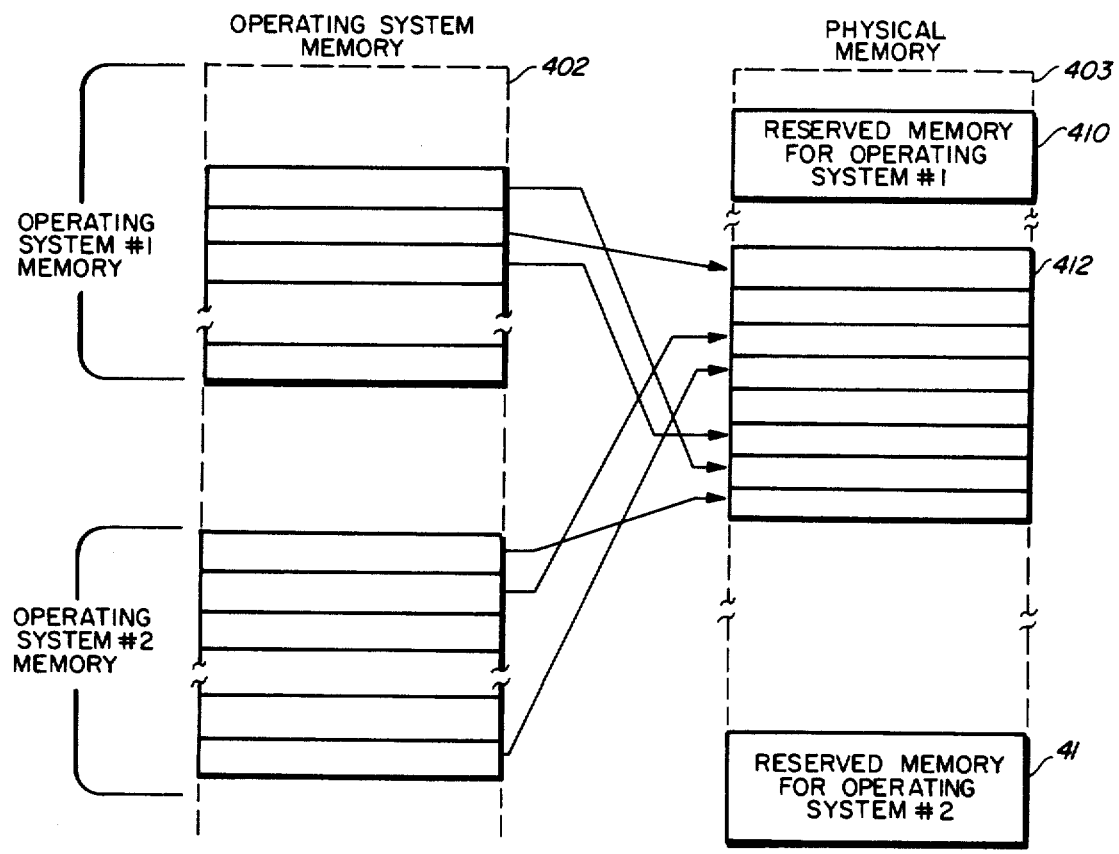
FIG. 14 is a schematic diagram demonstrating how memory is accessed by a first and a second operating system.

In dealing with a data processing unit sharing operating systems, it is necessary that memory space allocated to each operating system be inaccessible to the other operating systems. FIG. 14 indicates the manner in which this may be accomplished. A page table for the operating system is shown with locations associated with each of two operating systems. The address associated with operating system 1 will point to a group of locations in the physical memory 403. Similarly, the addresses stored in the group of locations associated with operating system 2 indicate a different group of memory locations. Thus, the physical memory 403 is divided in groups of memory addresses which are the result of a paging operation in the page table 402. Thus, operating system 1, or operating system 2, can be addressed in contiguous locations (i.e., for each operating system), but the groups of physical memory addresses associated with each page table address can be located throughout the physical memory address space. One advantage of the paging is that "holes" in the physical memory space (i.e., such as can result from an error in the memory unit) can be avoided when the page table is formed during an initialization process. FIG. 14 also illustrates the important feature that the reserved memory spaces 410 and 411 for operating system 1 and operating system 2 are unavailable to the operating system. Furthermore, the reserve memory spaces can be located anywhere in the physical memory.

Figure 15:
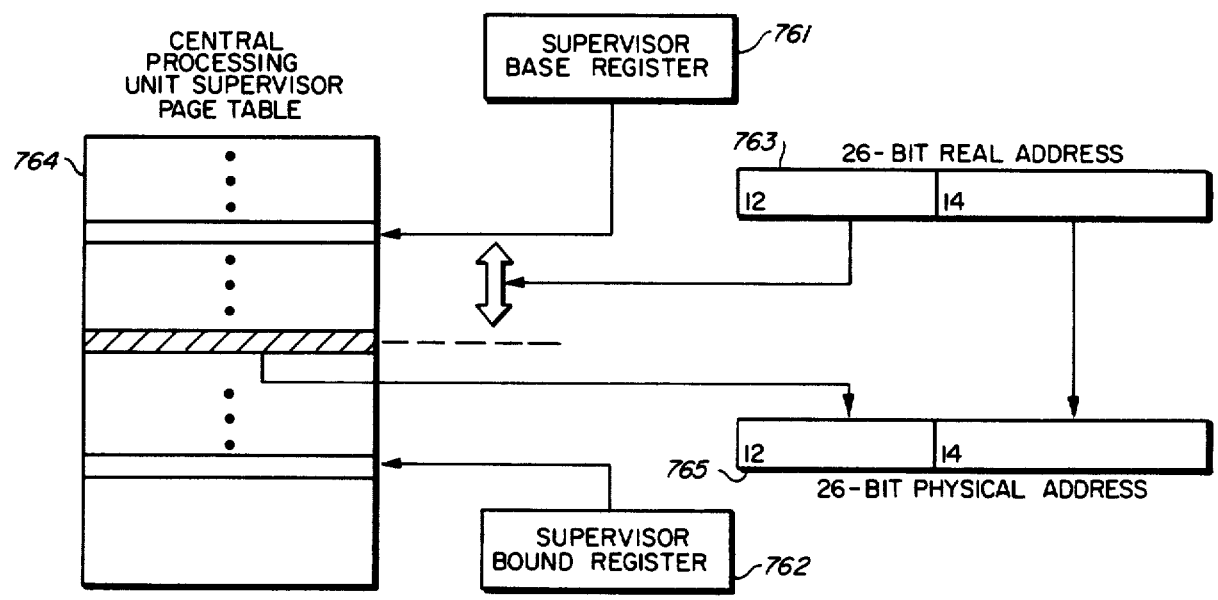
FIG. 15 is a block diagram showing the use of the supervisor base address register and the supervisor bound address register for isolation of the memory locations of an operating system.

Referring next to FIG. 15, the use of the supervisor base address and the supervisor bound for the isolation of operating system is shown. A supervisor page table directory 764 is provided during initialization, and provides the correspondence between an operating system address and an address in physical memory. During initialization or re-activation of each operating sytem, the supervisor base register 761 and the supervisor bound register 762 have data entered therein. In the preferred embodiment, the first twelve bits of an address developed during normal execution of instruction provides an off-set from the base address. The base address is determined by the currently active operating system, i.e., each operating system will have a predetermined base address in the supervisor page table directory. The supervisor bound quantity will determine the number of page table directory location allocated to the operating system. Thus, when a 26 bit real address 763 is applied to the supervisor paging apparatus, the first 12 bits point to location 770, i.e., the address in the page address register plus the off-set defined by the highest order bit of the real address. The quantity in the bound register ensures that the location 770 is with contiguous directory location allocated to the operating system. The contents of location 770 are a 12 bit quantity which replaces the 12 bit off-set quantity in the address to provide an address in physical memory.

Figure 16:
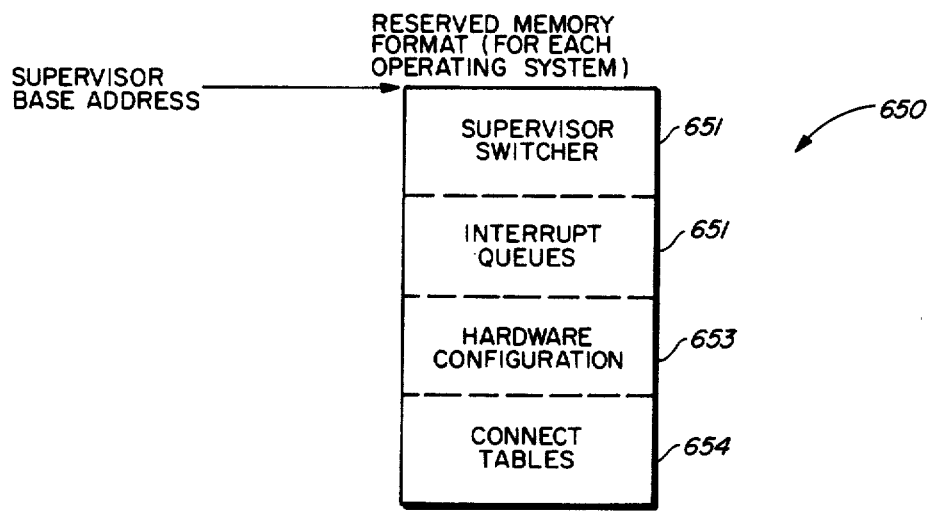
FIG. 16 is a block diagram of the format of reserved memory for each operating system.

Referring to FIG. 16, the general format of the reserved memory 650 for each operating system is shown. The supervisor switcher 651 portion of the reserved memory contains the program necessary for interruption or for initialization of an operating system. A more detailed description of this memory area will be given. Reserved memory portion labelled interrupt queues 652 are hardware loaded prioritized interrupts that are received by an operating system which is currently inactive. When the operating sytem becomes active, these queues will be interrogated and appropriate responses enabled. Hardware configuration 653 portion of the reserved memory is loaded upon initialization and provides a record of the resources (i.e., data processing system components) available to the operating system. The connect tables 654 portion of reserved memory provides a list of the resources currently available to the operating systems. Summarizing, the reserved memory is devoted to storing information necessary to maintain the isolation of the operating systems.

Referring to the supervisor switches 651 portion of reserved memory 650, the data stored therein provides the coded signals to process the change from one operating system to a second operating system. Included therein are the entry location (into the reserved memory switches) and the exit location from the reserved memory. Locations are included to safestore the contents of the central processing unit registers. Thus safestore locations are loaded by the initialization procedures, and when the operating system is activated, these locations provide the initialization. When the operating system asssociated with reserve memory is inactivated, these locations are filled with the contents of the central processing unit so that when the operating system is reactivated, the central processing unit will return to the state existing at the time it was inactivated. Also stored in the supervisor switches of the reserved memory are the quantities for the supervisor base and the supervisor bound. During initialization of a central processing unit, a supervisor page table direction is established. Each supervisor page generally consists of a multiplicity of normal pages. Moreover, the supervisor page table directory is used in the final translation from the address used by the operating system to the location in physical memory is performed through the supervisor page table. The supervisor base address points to the first in a series of sequential locations in the supervisor page table location. The operating sytem address contains an offset which indictes which location in the sequential supervisor page table directory the address refers. The supervisor bound ensures that off-set does not exceed the locations in the supervisor page table directory allocated to the operating system. If this occurred, the physical memory location addressed would be outside the area reserved for the operating system. The supervisor base and bound address are stored in registers in the central unit pipeline structure when the operating system is activated. The reserved memory supervisor switches includes a reserved memory base address and a bound. Again, these quantities are stored in the central unit pipeline structure (in the descriptor stack in the preferred embodiment) and provides the address of reserved memory when a predetermined fault is detected. Indeed in the preferred embodiment, the off-set from the base address in the reserved memory for handling of faults requiring attention of the supervisory processes in the same off-set from the operating base addressed as is used in the normal fault handling procedures. Also included in the reserved memory is the code allowing entry into the connect table. A memory location holds a quantity that will be loaded in a supervisor fault enable register. The quantity has a pattern which defines all the fault conditions that require a response from the supervisor procedures. When a fault condition is defined by signal pattern, this pattern is compared with the contents of the supervisor fault enable register to determine if the supervisor procedures or the normal operating procedures should be used to respond to the condition. A reserved memory location is used to store the faults pending register contents. These contents are re-entered into faults pending register when the operating system is reactivated so that conditions originally existing for the operating system are restored. Other reserved memory locations implement the use of a supervisor timer so that at the end of a predetermined number of clock cycles, the currently active operating system will receive a fault condition causing a new operating system to be activated. Thus one of the locations will have a (clock) count determining the time that the operating system will be active. Still another location contains data to be entered in the option register. This register contains signals control certain door dependent variables. For example, a decor code is included. This code is compared in an operation code to ensure that the instruction is permitted in the decor of the operating system. Another quantity that can be stored is whether intermediate paging (not the supervisor paging) is employed. Other register locations include other decor dependent data that are loaded into the hardware apparatus to make the central processing unit decor consistent with the active operating system. For example, in virtual address formation, a working space number is required, while other operating systems may not require this quantity to be available to the operating system i.e., loaded in preselected register locations. Finally, an offset for the hardware configuration table is present.

The above summary is a partial list of data entered in the reserved memory. It will be clear that other data and procedures may be available for an operating system supervisor procedures.

A more detailed use of the supervisor procedures will now be given by way of illustration. When appropriate conditions occur in the central processing unit, such as the supervisor clock reaching a predetermined number of counts, the operating system reaching a point where it will voluntarily relinquish control of the central processing unit etc, a set of signals indicating a fault condition is entered in the fault register. The signals in the fault register are compared with signals that have been previously entered in the supervisor fault enable register. When a coincidence is detected, a different operating system is to be activated through the supervisor procedures, and a supervisor fault procedure is enabled. The supervisor fault procedure used the reserved memory base address, stored in the central unit pipeline structure (i.e., in the descriptor stack) combined in a constant offset number to enter the reserved memory unit of the currently active operating system. The procedures beginning with the entry address cause the storage quantities, in registers in the central processing unit, in the appropriate locations in the reserved memory. In addition, the contents of the faults pending register are stored. These quantities allow the operating system being deactivated, to resume in the state when the operating system is reactivated. When this storage is complete, the reserved memory exits from a location that addresses an entry in the reserved memory of a second operating system. The second operating system loads the base and bound address of the reserved memory associated with the second operating system into the central unit pipeline structure (i.e., the descriptor stack) so that the instruction executed using the supervisor procedures can have the appropriate address formation. The supervisor base and bound is loaded in the final paging registers thus providing the mechanism for addressing only the physical memory associated with the second operating system and effectively isolating non-associated physical memory from the second operating system. The procedures of the reserve memory load the option register, which in addition to other decor-dependent information, provides the code that determines when a non-permitted instruction (e.g., because of incorrect decor requirements) has entered execution. The procedures of the reserved memory cause the fault pending register to be loaded and the decor-dependent quantities are entered in appropriate register in the central processing unit. The central processing unit is now either initialized with respect to the second operating system or the previous state, from which the second operating system exited, has been reestablished. The reserved memory of the second operating system now executes a procedure by which the memory associated with the second operating system is entered and control of this data processing unit is now with the second operating system.

The above description is included to illustrate the operation of the preferred embodiment and is not meant to limit the scope of the invention. The scope of the invention is to be limited only by the following claims. From the foregoing discussion, many variations would be apparent to one skilled in the art that would yet be encompassed by the spirit and scope of the invention

What is claimed is:

1. In a data processing unit, including a memory having a plurality of definable locations each location defined by a real memory address, and further in said data processing unit a plurality of operating systems concurrently reside, each operating system having associated therewith an operating system page and the data processing unit having associated therewith a real memory page, an apparatus for providing overall control of said data processing unit, wherein each operating system is allocated a time period for controlling said data processing unit, said apparatus comprising:
 (a) first execution means for generating an effective address;
 (b) second execution means, operatively connected to said first execution means, for generating a composite address within the operating system page;
 (c) third execution means, operatively connected to said first and second execution means, for performing a paging function to obtain the operating system page for an operating system currently being executed and to obtain the real memory page to generate the real memory address of a word in memory desired to be fetched;
 (d) control logic means, operatively connected to said first, second, and third execution means, for determining the time period a first operating system is permitted to control the data processing unit; and
 (e) storage means, operatively connected to said first, second, and third execution means, and to said control logic means, said storage means having a plurality of reserved areas corresponding to each operating system, each of such reserved areas accessible by the control logic means and not accessible by the operating systems, each reserved area utilized to store data processing unit parameters when control is being transferred from a first operating system currently being executed to a second operating system, and the stored data processing unit parameters, contained in the reserved area correspond to the second operating system obtaining control, being utilized to initialize said data processing unit before the second operating system obtains control.

2. In a data processing unit, an apparatus according to claim 1, wherein said control unit comprises in part:
 (a) first register means for storing an instruction to be executed by said data processing unit;
 (b) second register means, operatively connected to said first register means, for storing a preselected portion of the instruction stored in said first register means;
 (c) memory means, operatively connected to said first and second register means, for associating said preselected portion of the instruction stored in said first register means with an indicia of one of said operating systems; and
 (d) comparison means, operatively connected to said first and second register means, for comparing an indicia of the operating system currently being executed with the operating system indicia associated with the preselected of the instruction stored in said first register means, said comparison means permitting said data processing unit to continue execution of the instruction when the instruction is part of the operating system currently being executed.

3. In a data processing unit, an apparatus according to claim 2, wherein said second execution means comprises:
 a. input buffer means, having an input adapted to receive a word, said word containing address information, for temporarily storing said word;
 b. control unit means, having an input adapted to receive an execution code from said first execution means, for generating control signals to control the operation of said second execution means to correspond to the execution code associated with said word and to correspond to the operating system currently being executed; and c. reconfiguration means, operatively connected to said input buffer means and to said control unit means, for generating the composite address within the operating system page in response to the control signals received from the control unit means.

4. In a data processing unit, an apparatus for providing overall control of said data processing unit, according to claim 3, wherein said data processing unit further includes a plurality of peripheral systems and a control interface unit (CIU) having a plurality of input/output (I/O) channels, said control logic means further comprising:

second control logic means for specifying the connectability of peripheral systems to said CIU, thereby separating the input/output of each operating system and avoiding any interferences in the use of the I/O channels between operating systems.

5. In a data processing unit, an apparatus according to claim 1, wherein said second execution means comprises:

a. input buffer means, having an input adapted to receive a word, said word containing address information, for temporarily storing said word;

b. control unit means, having an input adapted to receive an execution code from said first execution means, for generating control signals to control the operation of said second execution means to correspond to the execution code associated with said word and to correspond to the operatng system currently being executed; and c. reconfiguration means, operatively connected to said input buffer means and to said control unit means for generating the composite address within the operating system page in response to the control signals received from the control unit means.

6. In a data processing unit, an apparatus for providing overall control of said data processing unit, according to claim 1, wherein said data processing unit further includes a plurality of peripheral systems and a control interface unit (CIU) having a plurality of input/output (I/O) channels, said control logic means further comprising:

second control logic means for specifying the connectability of peripheral systems to said CIU, thereby separating the input/output of each operating system and avoiding any interferences in the use of the I/O channels between operating systems.

* * * * *